United States Patent
Yang et al.

(10) Patent No.: US 11,564,245 B2
(45) Date of Patent: Jan. 24, 2023

(54) UPLINK-BASED RADIO LINK FAILURE REPORTING FOR A CELL GROUP

(71) Applicant: QUALCOMM Incorporated, San Diego, CA (US)

(72) Inventors: Ming Yang, San Diego, CA (US); Kausik Ray Chaudhuri, San Diego, CA (US); Mukesh Kumar Mittal, San Diego, CA (US); Long Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/165,110

(22) Filed: Feb. 2, 2021

(65) Prior Publication Data

US 2021/0250974 A1 Aug. 12, 2021

Related U.S. Application Data

(60) Provisional application No. 62/975,074, filed on Feb. 11, 2020.

(51) Int. Cl.
  *H04W 72/12* (2009.01)
  *H04W 72/04* (2009.01)
  (Continued)

(52) U.S. Cl.
  CPC ....... *H04W 72/1284* (2013.01); *H04W 24/10* (2013.01); *H04W 72/042* (2013.01);
  (Continued)

(58) Field of Classification Search
  CPC . H04W 72/1284; H04W 76/19; H04W 76/18; H04W 76/27; H04W 24/10; H04W 72/042; H04W 72/1829; H04W 72/1294; H04W 72/14; H04W 36/0033; H04W 28/04
  See application file for complete search history.

(56) References Cited

U.S. PATENT DOCUMENTS

| 2015/0146674 A1* | 5/2015 | Krishnamurthy ..... H04W 52/50 370/329 |
| 2019/0253949 A1* | 8/2019 | Park ..................... H04B 7/0695 |

(Continued)

FOREIGN PATENT DOCUMENTS

CN 107889133 A * 4/2018 ........... H04B 17/309

OTHER PUBLICATIONS

International Search Report and Written Opinion—PCT/US2021/016426—ISA/EPO—dated May 19, 2021.

*Primary Examiner* — Mewale A Ambaye
(74) *Attorney, Agent, or Firm* — Holland & Hart LLP

(57) ABSTRACT

Methods, systems, and devices for wireless communications are described. A user equipment (UE) may receive an uplink grant via downlink control signaling for a cell group. The UE may determine an uplink error rate for the cell group based on the downlink control signaling. The UE may identify a radio link failure condition for uplink based on the uplink error rate exceeding an uplink error rate threshold. The UE may transmit a radio link failure indication indicating that the radio link failure condition is based on the uplink error rate. The network may send a cell group reconfiguration message to the UE to release the cell group.

30 Claims, 17 Drawing Sheets

(51) Int. Cl.
    *H04W 24/10*     (2009.01)
    *H04W 76/18*     (2018.01)
    *H04W 76/27*     (2018.01)
    *H04W 76/19*     (2018.01)

(52) U.S. Cl.
    CPC ........... *H04W 76/18* (2018.02); *H04W 76/19* (2018.02); *H04W 76/27* (2018.02)

(56) References Cited

U.S. PATENT DOCUMENTS

| | | | |
|---|---|---|---|
| 2019/0253986 A1* | 8/2019 | Jeon | H04B 7/0695 |
| 2019/0254042 A1* | 8/2019 | Cirik | H04W 74/004 |
| 2019/0357064 A1 | 11/2019 | Hosseini et al. | |
| 2019/0380052 A1 | 12/2019 | Yang et al. | |
| 2021/0105812 A1* | 4/2021 | Rastegardoost | H04L 1/08 |
| 2021/0250974 A1* | 8/2021 | Yang | H04W 76/19 |
| 2022/0217042 A1* | 7/2022 | Santhanam | H04B 7/0417 |

* cited by examiner

UPLINK-BASED RADIO LINK FAILURE REPORTING FOR A CELL GROUP

CROSS REFERENCE

The present Application for patent claims the benefit of U.S. Provisional Patent Application No. 62/975,074 by YANG et al., entitled "UPLINK-BASED RADIO LINK FAILURE REPORTING FOR A CELL GROUP," filed Feb. 11, 2020, assigned to the assignee hereof, and expressly incorporated by reference herein.

BACKGROUND

The following relates generally to wireless communications, and more specifically to uplink-based radio link failure reporting for a cell group.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may be connected with multiple cell groups, including a master cell group and one or more secondary cell groups. The UE may perform radio link monitoring to determine whether radio links associated with the cell groups are experiencing interference or have poor quality.

SUMMARY

The described techniques relate to improved methods, systems, devices, and apparatuses that support uplink-based radio link failure (RLF) reporting for a cell group. Generally, the described techniques provide for determining that radio link failure has occurred based on uplink radio link characteristics. A user equipment (UE) may be configured with multiple cell groups, each providing a connection to a wireless communications network. For example, the UE may be configured with a master cell group (MCG) and one or more secondary cell groups (SCGs). The UE may monitor and measure the quality of the radio links of the cell groups and indicate radio links with poor quality or transmission failures. In some cases, the UE may be triggered to report radio link failure for a radio link if the radio link meets a certain condition. For example, the UE may monitor an error rate of a radio link and compare the error rate to a threshold. If the radio link's error rate is above the threshold, it may be an indicator that the radio link of the cell group is failing, and the UE may declare radio link failure for the cell group.

The techniques described herein provide for a UE to determine that radio link failure has occurred based on an uplink error rate. For example, a UE may declare radio link failure for a cell group based on a block error rate (BLER) for an uplink radio link of the cell group exceeding a threshold. In another example, a radio link failure may be declared for a cell group based on one or more requests or commands for increased transmit power. In some cases, the UE may consider both downlink and uplink error rates when reporting cell group failure. If either the downlink error rate or the uplink error rate is above a threshold for a certain amount of time, the UE may transmit an indication reporting cell group failure and indicate the cause of the cell group failure. For example, the UE may indicate that radio link failure was declared based on downlink radio failure, uplink radio failure, or both uplink and downlink radio failure. The UE may be configured to release the failing cell group and, in some cases, be reconfigured with a new cell group. Additional techniques, such as delaying or stopping further measurements of the cell group or new cell groups, are described herein. By implementing the techniques described herein, a wireless communications system may support fast radio link failure indication for an uplink radio link.

A method of wireless communication at a UE is described. The method may include receiving an uplink grant via downlink control signaling for a cell group, identifying a radio link failure condition for uplink based on an uplink block error rate associated with the downlink control signaling exceeding an uplink block error rate threshold, and transmitting a radio link failure indication indicating that the radio link failure condition is based on the uplink block error rate.

An apparatus for wireless communication at a UE is described. The apparatus may include a processor, memory coupled with the processor, and instructions stored in the memory. The instructions may be executable by the processor to cause the apparatus to receive an uplink grant via downlink control signaling for a cell group, identify a radio link failure condition for uplink based on an uplink block error rate associated with the downlink control signaling exceeding an uplink block error rate threshold, and transmit a radio link failure indication indicating that the radio link failure condition is based on the uplink block error rate.

Another apparatus for wireless communication at a UE is described. The apparatus may include means for receiving an uplink grant via downlink control signaling for a cell group, identifying a radio link failure condition for uplink based on an uplink block error rate associated with the downlink control signaling exceeding an uplink block error rate threshold, and transmitting a radio link failure indication indicating that the radio link failure condition is based on the uplink block error rate.

A non-transitory computer-readable medium storing code for wireless communication at a UE is described. The code may include instructions executable by a processor to receive an uplink grant via downlink control signaling for a cell group, identify a radio link failure condition for uplink based on an uplink block error rate associated with the downlink control signaling exceeding an uplink block error rate threshold, and transmit a radio link failure indication indicating that the radio link failure condition is based on the uplink block error rate.

Some examples of the method, apparatuses, and non-transitory computer-readable medium described herein may further include operations, features, means, or instructions for refraining from performing measurements for radio link failure or transmitting another radio link failure indication for a delay period based on transmitting the radio link failure indication.

Some examples of the method, apparatuses, and non-transitory computer-readable medium described herein may further include operations, features, means, or instructions for receiving a request to refrain from performing measurements for radio link failure or transmitting another radio link failure indication for a delay period based on transmitting the radio link failure indication.

Some examples of the method, apparatuses, and non-transitory computer-readable medium described herein may further include operations, features, means, or instructions for refraining from transmitting a measurement report for the cell group after transmitting the radio link failure indication.

Some examples of the method, apparatuses, and non-transitory computer-readable medium described herein may further include operations, features, means, or instructions for receiving a cell group reconfiguration message based on transmitting the radio link failure indication, releasing the cell group based on the cell group reconfiguration message, and connecting to another cell group indicated by the cell group reconfiguration message.

In some examples of the method, apparatuses, and non-transitory computer-readable medium described herein, the cell group reconfiguration message may be a radio resource control connection reconfiguration message.

In some examples of the method, apparatuses, and non-transitory computer-readable medium described herein, identifying the radio link failure condition further may include operations, features, means, or instructions for determining that a downlink block error rate associated with the cell group exceeds a downlink block error rate threshold.

In some examples of the method, apparatuses, and non-transitory computer-readable medium described herein, the cell group may be a secondary cell group.

In some examples of the method, apparatuses, and non-transitory computer-readable medium described herein, the UE may be configured for standalone communications or non-standalone communications.

Some examples of the method, apparatuses, and non-transitory computer-readable medium described herein may further include operations, features, means, or instructions for determining the uplink block error rate exceeds the uplink block error rate threshold for a period of time, where the radio link failure indication may be transmitted based on the determining.

A method of wireless communications is described. The method may include receiving a radio link failure indication for uplink from a UE indicating that an uplink block error rate associated with a first cell group configured for the UE exceeded an uplink block error rate threshold and transmitting, to the UE, a cell group reconfiguration message to release the first cell group configured for the UE and reconfigure a second cell group for the UE based on the radio link failure indication.

An apparatus for wireless communications is described. The apparatus may include a processor, memory coupled with the processor, and instructions stored in the memory. The instructions may be executable by the processor to cause the apparatus to receive a radio link failure indication for uplink from a UE indicating that an uplink block error rate associated with a first cell group configured for the UE exceeded an uplink block error rate threshold and transmit, to the UE, a cell group reconfiguration message to release the first cell group configured for the UE and reconfigure a second cell group for the UE based on the radio link failure indication.

Another apparatus for wireless communications is described. The apparatus may include means for receiving a radio link failure indication for uplink from a UE indicating that an uplink block error rate associated with a first cell group configured for the UE exceeded an uplink block error rate threshold and transmitting, to the UE, a cell group reconfiguration message to release the first cell group configured for the UE and reconfigure a second cell group for the UE based on the radio link failure indication.

A non-transitory computer-readable medium storing code for wireless communications is described. The code may include instructions executable by a processor to receive a radio link failure indication for uplink from a UE indicating that an uplink block error rate associated with a first cell group configured for the UE exceeded an uplink block error rate threshold and transmit, to the UE, a cell group reconfiguration message to release the first cell group configured for the UE and reconfigure a second cell group for the UE based on the radio link failure indication.

Some examples of the method, apparatuses, and non-transitory computer-readable medium described herein may further include operations, features, means, or instructions for transmitting a request for the UE to refrain from measuring radio link failure or transmitting another radio link failure indication for a delay period based on receiving the radio link failure indication.

Some examples of the method, apparatuses, and non-transitory computer-readable medium described herein may further include operations, features, means, or instructions for configuring the UE to refrain from transmitting a measurement report for the first cell group based on the UE transmitting the radio link failure indication.

Some examples of the method, apparatuses, and non-transitory computer-readable medium described herein may further include operations, features, means, or instructions for determining, based on the radio link failure indication, that a downlink block error rate associated with the first cell group exceeds a downlink block error rate threshold, where the cell group reconfiguration message may be transmitted based on the downlink block error rate exceeding the downlink block error rate threshold.

In some examples of the method, apparatuses, and non-transitory computer-readable medium described herein, the first cell group may be a secondary cell group.

In some examples of the method, apparatuses, and non-transitory computer-readable medium described herein, the uplink error rate is based on a BLER or uplink feedback, or both.

Some examples of the method, apparatuses, and non-transitory computer-readable medium described herein may further include operations, features, means, or instructions for configuring the UE for standalone communications or non-standalone communications.

In some examples of the method, apparatuses, and non-transitory computer-readable medium described herein, the cell group reconfiguration message includes a radio resource control connection reconfiguration message.

DETAILED DESCRIPTION

In some wireless communications system, a user equipment (UE) may be configured with multiple cell groups, each providing a connection to a wireless communications network. For example, a UE may be configured with a master cell group (MCG) and one or more secondary cell groups (SCGs). The UE may monitor and measure the quality of the radio links of the cell groups and indicate radio links with poor quality or transmission failures. In some cases, the UE may be triggered to report a radio link failure (RLF) for a radio link if the radio link meets a certain condition. For example, the UE may monitor an error rate of a radio link and compare the error rate to a threshold. If the radio link's error rate is above the threshold, it may be an indicator that the radio link of the cell group is failing, and the UE may declare radio link failure for the cell group. In some wireless communications systems, a UE may send an SCG failure report based on downlink BLER. As long as the UE has a low downlink error rate, the UE may not declare radio link failure. In some cases, however, the UE may have a high uplink error rate but still not declare radio link failure due to having the low downlink error rate. In these cases, the UE may not be able to successfully and reliably send uplink transmissions. The UE may have poor performance and low throughput, which may consume the device's battery and waste power.

Wireless communications systems described herein support enhanced techniques for declaring radio link failure. For example, a UE may declare radio link failure for a cell group based on an error rate for uplink. In some cases, the UE may consider both downlink and uplink error rates when reporting cell group failure. If either the downlink error rate or the uplink error rate is above a threshold for a certain amount of time, the UE may transmit an indication reporting cell group failure and indicate the cause of the cell group failure. For example, the UE may indicate that radio link failure was declared due to downlink radio failure, uplink radio failure, or both uplink and downlink radio failure. The UE may be configured to release the failing cell group and, in some cases, be reconfigured with a new cell group. Additional techniques, such as delaying or stopping further measurements of the cell group or new cell groups, are described herein. By implementing the techniques described herein, a wireless communications system may support fast radio link failure indication for an uplink radio link.

Aspects of the disclosure are initially described in the context of a wireless communications system. Aspects of the disclosure are further illustrated by and described with reference to apparatus diagrams, system diagrams, and flowcharts that relate to uplink-based radio link failure reporting for a cell group.

Figure 1:
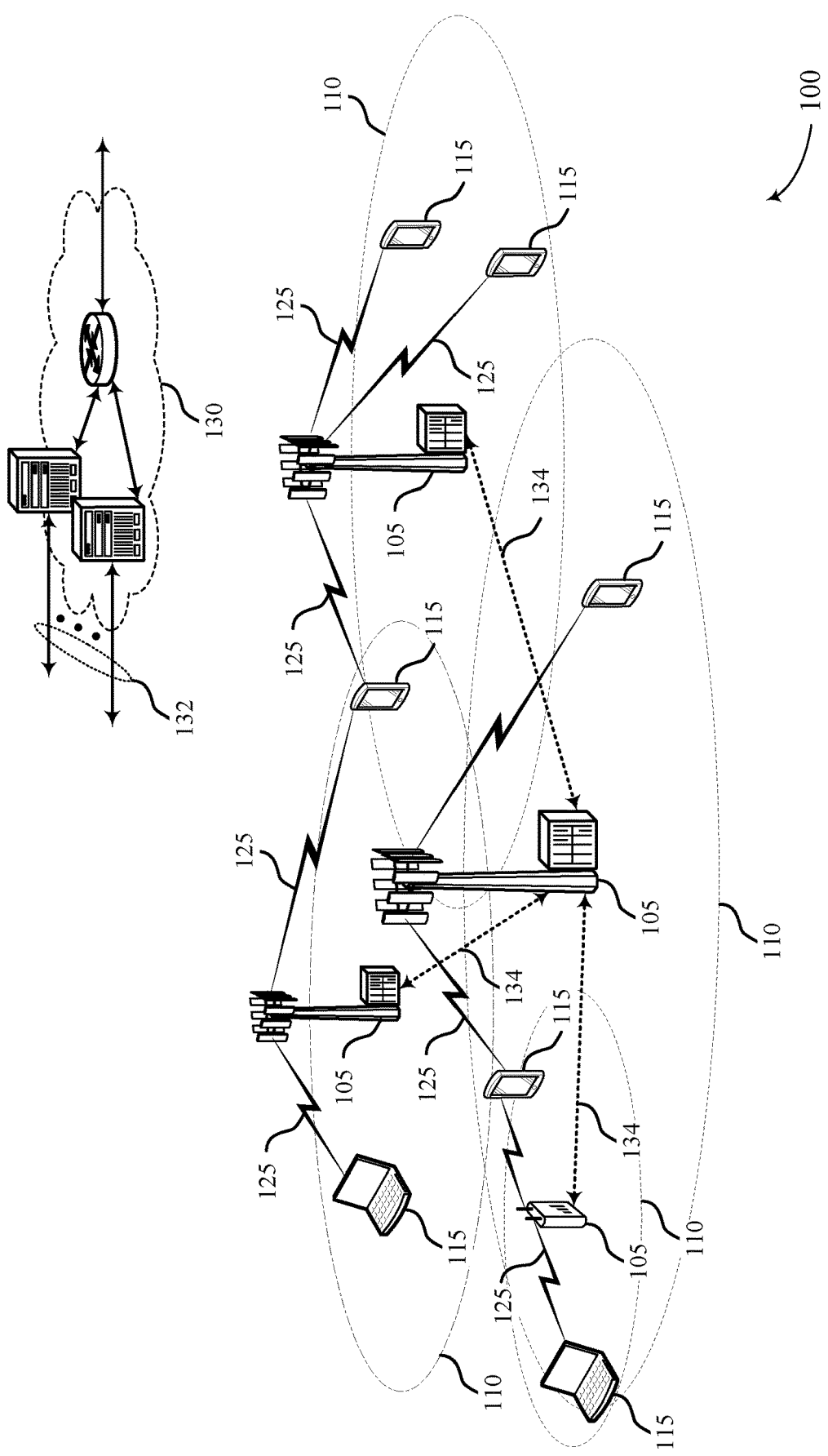
FIG. 1 illustrates an example of a system for wireless communications that supports uplink-based radio link failure reporting for a cell group in accordance with aspects of the present disclosure.

FIG. 1 illustrates an example of a wireless communications system 100 that supports uplink-based radio link failure reporting for a cell group in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 of the wireless communications system 100 may be configured with multiple cell groups, each providing a connection to a wireless communications network. For example, the UE 115 may be configured with an MCG and one or more SCGs. The UE 115 may perform RLM and measure the quality of the radio links of the cell groups. The UE 115 may indicate radio links with poor quality or transmission failures. In some cases, the UE may be triggered to report radio link failure for a radio link if the radio link meets a certain condition.

The wireless communications system 100 may support a UE 115 determining that radio link failure has occurred based on an uplink error rate. For example, the UE 115 may declare radio link failure for a cell group based on a BLER for an uplink radio link of the cell group exceeding a threshold. In some cases, the UE 115 may consider both downlink and uplink error rates when reporting cell group failure. If either the downlink error rate or the uplink error rate is above a threshold for a certain amount of time, the UE 115 may transmit an indication reporting cell group failure and indicate the cause of the cell group failure. For example, the UE 115 may indicate that radio link failure was declared based on downlink radio failure, uplink radio failure, or both uplink and downlink radio failure. The UE may be configured to release the failing cell group and, in some cases, be reconfigured with a new cell group.

Figure 2:
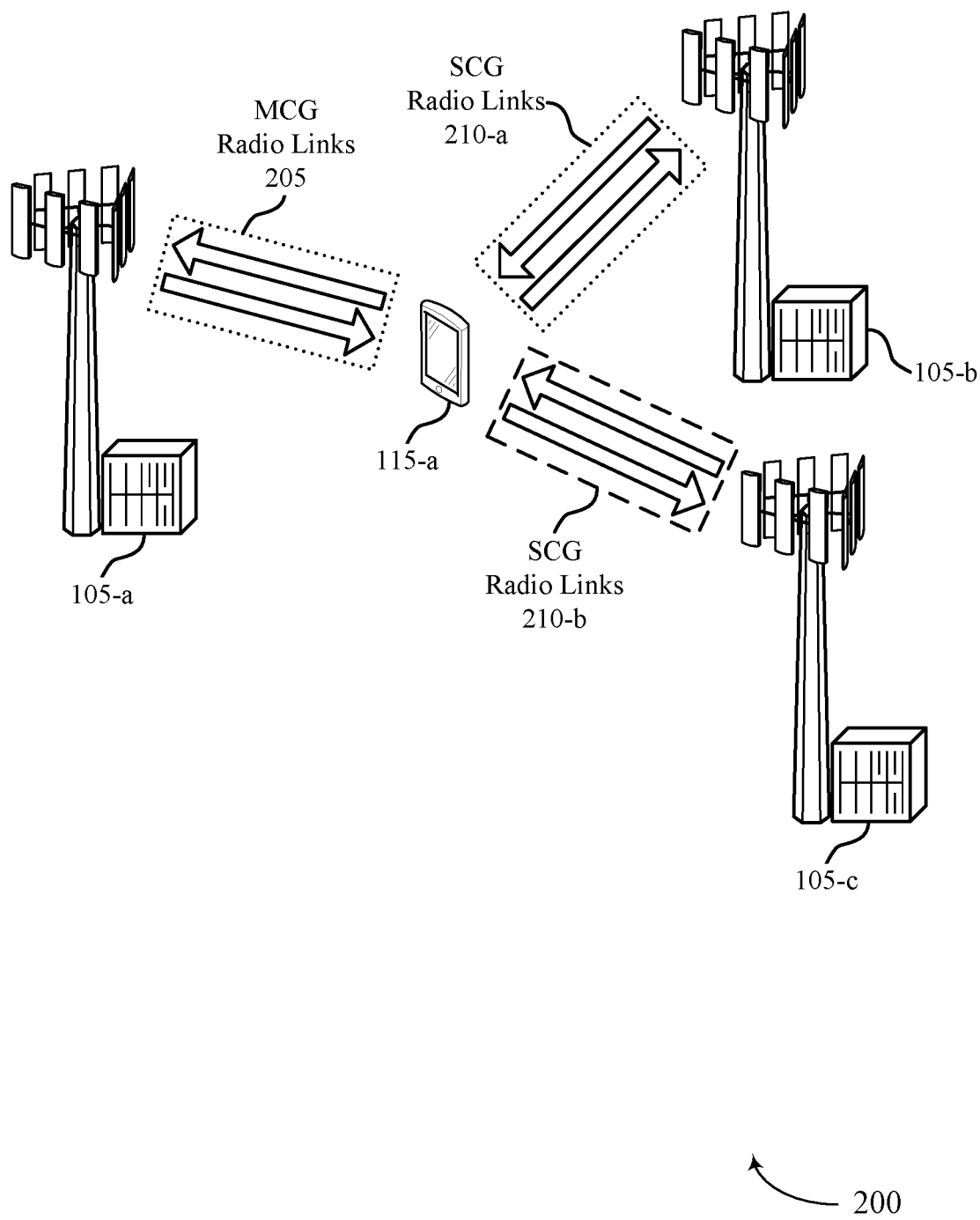
FIG. 2 illustrates an example of a wireless communications system that supports uplink-based radio link failure reporting for a cell group in accordance with aspects of the present disclosure.

FIG. 2 illustrates an example of a wireless communications system 200 that supports uplink-based radio link failure reporting for a cell group in accordance with aspects of the present disclosure. In some examples, the wireless communications system 200 may implement aspects of wireless communications system 100. The wireless communications system 200 may include UE 115-a and base stations 105, which may be respective examples of a UE 115 and base stations 105 as described with reference to FIG. 1.

UE 115-a may be configured with an MCG and one or more SCGs. For example, base station 105-a may provide the MCG. UE 115-a may be configured with MCG radio links 205, which may include uplink and downlink radio links. UE 115-a may communicate control and data signaling with the MCG. For example, the MCG may convey user data via a user plane and convey control signaling via a control plane. In some cases, the MCG may be connected to a core network to convey control signaling for UE 115-a.

In some cases, base station 105-b may provide an SCG. In some cases, UE 115-a may be configured with multiple SCGs. In some cases, base station 105-b may provide multiple cells, or base station 105-b may include one or more small cells or transmission and reception points, which may each provide a secondary cell for UE 115-a. In some cases, the SCG may be used for data signaling via the user plane. In some cases, the MCG and the SCGs may be connected and communicate via backhaul links, such as X2 or Xn interfaces.

UE 115-a may perform RLM on the MCG radio links 205 and SCG radio links 210. UE 115-a may monitor and measure the quality of the radio links and indicate any radio links with poor quality or transmission failures. In some cases, UE 115-a may be triggered to report a radio link failure for a radio link if the radio link meets a radio link failure condition. Radio link failure may be triggered based on different kinds of failures. For example, radio link failure may be triggered due to a downlink control channel error rate, a handover failure, a random access channel failure, an RRC reconfiguration failure, an RLC failure, or an unsuccessful beam failure recovery procedure. In some cases, these failures may correspond to layers of a protocol stack. For example, the downlink control channel error rate failure and unsuccessful beam failure recovery procedure failure may correspond to Layer 1, or the physical layer.

In some cases, declaring radio link failure in a primary cell or for the MCG radio links 205 may trigger an RRC reestablishment. For example, an RRC connection for UE 115-a may be released and reconfigured. Declaring radio link failure in the SCG for the SCG radio links 210 may trigger an SCG failure report, and UE 115-a may release the corresponding SCG. Radio link failure may be declared for a primary cell or a secondary cell of the SCG.

In an example, UE 115-a may monitor a radio link of a cell group based on an error rate, such as BLER, of a physical downlink control channel (PDCCH). If the PDCCH BLER is below a first threshold percentage, then, in some systems, this radio link may be considered in-sync. If the PDCCH BLER is above a second (e.g., higher) threshold percentage, then the radio link may be considered out-of-sync. If the radio link is out-of-sync for a long enough time (e.g., based on a timer), UE 115-a may declare radio link failure. BLER may be measured based on a number of successfully communicated blocks. For example, if a transmitter sends ten transport blocks, and nine of those transport blocks are successfully received, the BLER may be one out of ten, or 10%. In some cases, a receiver may determine the BLER based on the correctly and incorrectly received blocks. In some cases, a transmitter may determine the BLER based on feedback for the transmitted blocks.

In some wireless communications systems, a UE 115 may send an SCG failure report based on downlink BLER. In some cases, the UE 115 may experience a low downlink error rate, but a high uplink error rate. Despite the high uplink error rate, the UE 115 may not be triggered to declare radio link failure for the SCG. Instead, the UE 115 may wait until the serving cell determines that the UE 115 has failed to provide feedback (e.g., on the uplink radio link) a threshold number of times and declare RLC failure. Declaring RLC failure may be a much longer process than declaring radio link failure for high downlink BLER. While the UE 115 waits for the RLC failure declaration, the UE 115 may have poor performance and low throughput, which consumes power and wastes battery at the device.

Wireless communications system 200 may support enhanced techniques for declaring radio link failure for uplink. For example, UE 115-a may declare radio link failure for a cell group based on an error rate for uplink. In some cases, UE 115-a may consider both downlink and uplink error rates for cell group failure reporting. If either the downlink error rate or the uplink error rate is above a threshold for a certain amount of time, UE 115-a may report cell group failure and indicate the cause of the cell group failure. For example, UE 115-a may indicate that radio link failure was declared due to downlink radio link failure, uplink radio link failure, or both uplink and downlink radio link failure.

In another example, UE 115-a may determine an uplink error rate to declare radio link failure based on a change to a configuration. In some cases, if uplink communications are experiencing poor channel quality, base station 105-a may modify a transmission configuration for UE 115-a. For example, base station 105-a may increase a transmit power at UE 115-a. In some cases, UE 115-a may declare radio link failure for a cell group based on receiving one or more requests or commands for increased transmit power. If the number of requests, the requested transmit power, or another associated measurement or metric exceeds a threshold, UE 115-a may report cell group failure and indicate the cause of the cell group failure. For example, if UE 115-a is configured to use at least a threshold transmit power (e.g., a maximum transmit power or above) for a threshold duration of time, UE 115-a may declare uplink radio link failure. Similarly, if a power headroom satisfies a threshold for a threshold duration of time (e.g., lasting for a timer), UE 115-a may declare uplink radio link failure. In some examples, UE 115-a may determine uplink BLER based on the transmit power or power headroom, and the uplink BLER estimated from the transmit power or power headroom may be used to check for uplink radio link failure.

By implementing the techniques described herein, wireless communications system 200 may support quick radio link failure indication for an uplink radio link. In some cases, wireless communications system 200 may be an example of an NR wireless communications system, which may have imbalanced high bands and mid bands. Based on the imbalance, an uplink radio link may have high BLER while a downlink radio link may have low BLER. By implementing these techniques, a UE 115 may declare radio link failure if the uplink BLER is too high, even if the downlink BLER is still acceptable. These techniques may be applied for a UE 115 configured for standalone communications or non-standalone communications.

In an example, the uplink BLER for the SCG provided by base station 105-b may be above a threshold for a period of time. UE 115-a may report SCG failure by transmitting a radio link failure indication. The radio link failure indication may include an indicator that the cause of the radio link failure is based on the uplink BLER. The radio link failure indication may be transmitted to the MCG (e.g., provided by base station 105-a) or to an SCG (e.g., to the SCG provided by base station 105-*a* or to another SCG associated with one or more other transmission reception points).

The network may send a message to release the cell group for UE 115-*a*. For example, one of the cell groups may send an RRC connection reconfiguration message to release a cell group experiencing radio link failure. In some cases, the cell group may be an MCG or an SCG. For example, UE 115-*a* may be configured to release an SCG provided by base station 105-*b*. In some cases, the SCG may be one of multiple SCGs provided by base station 105-*b*. In some cases, UE 115-*a* may be reconfigured with a different cell group. For example, UE 115-*a* may be configured to connect to the SCG provided by base station 105-*c*. The network may send the message via the MCG or via an SCG. For example, base station 105-*a* may send the cell group release message, or base station 105-*b* may send the cell group release message.

In some cases, UE 115-*a* may delay cell group measurements after reporting the cell group failure. For example, after reporting the uplink radio link failure for the SCG and releasing that SCG, the network may delay measurements and reporting for UE 115-*a*. In some cases, the network may delay configuring the measurements and reporting, or the network may configure a delay for the measurements and reporting. For example, if UE 115-*a* is reconfigured with another SCG, the network may delay sending measurement and reporting configurations for the new SCG. Or, in some cases, the network may configure UE 115-*a* to wait for a certain period of time before taking or reporting measurements. For example, the network may configure UE 115-*a* with a timer, and UE 115-*a* may not take or report measurements until the timer expires.

In some cases, UE 115-*a* may determine to delay measurements or measurement reporting after sending the radio link failure indication. For example, after UE 115-*a* sends the radio link failure indication or after UE 115-*a* receives the cell group release message, UE 115-*a* may begin a timer and refrain from performing cell measurements, sending measurement reports, or both, until after the timer has expired. In some cases, UE 115-*a* may delay or stop sending measurement reports based on the previous SCG failure cause. For example, because the radio link failure was caused by uplink failure, UE 115-*a* may refrain from sending measurement reports (e.g., for a period of time or until reconfigured to send again).

Figure 3:
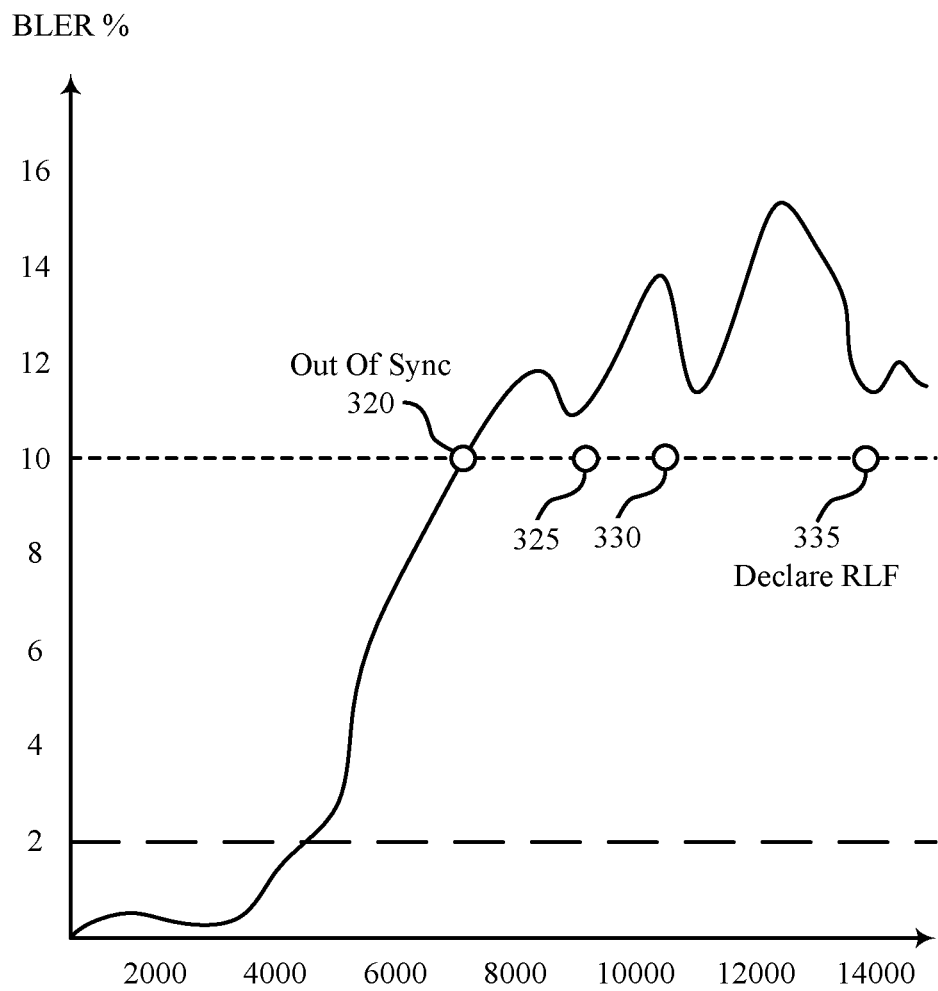
FIG. 3 illustrates an example of an error rate measurement that supports uplink-based radio link failure reporting for a cell group in accordance with aspects of the present disclosure.
Figure 3:
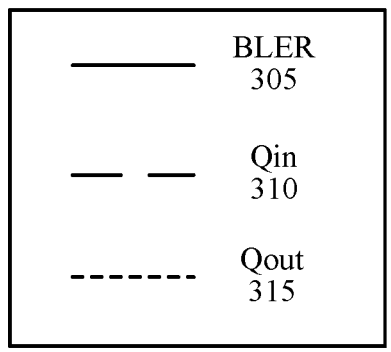

FIG. 3 illustrates an example of an error rate measurement 300 that supports uplink-based radio link failure reporting for a cell group in accordance with aspects of the present disclosure. In some examples, the error rate measurement 300 may implement aspects of wireless communications system 100.

As described herein, a UE 115 may monitor radio links to determine if radio link failure has occurred. There may be several triggers for declaring radio link failure. Some triggers for reporting radio link failure may be based on downlink error rates. For example, SCG failure reporting in some systems may be based on downlink BLER. In some cases, physical downlink control channel (PDCCH) BLER may be an example of the downlink BLER. Techniques described herein support enhanced techniques for declaring radio link failure based on a BLER measurement 305. The BLER measurement 305 may be based on measurements of downlink BLER, uplink BLER, or both. In other examples, a trigger for declaring radio link failure may include one or more requests or commands for increased transmit power. For example, if the number of requests or commands, a transmit power, or other measurement or metric exceeds a threshold, a radio link failure may be declared.

In some wireless systems, a UE 115 may measure downlink BLER based on network-configured RLM reference signal resources. For example, the RLM reference signal resources may include channel state information reference signal (CSI-RS) ports. In some cases, CSI-RS ports may be used to determine downlink BLER when the UE 115 is operating in a connected mode. In some examples, the CSI-RS ports may be multiplexed with a synchronization signal block, with a control resource set, or with a downlink shared channel demodulation reference signal. The UE 115 may measure a reference signal received power (RSRP) of the CSI-RS.

In some cases, the RLM reference signal resources may include synchronization signal blocks. The synchronization signal blocks may be, for example, synchronization signal/physical broadcast channel (SS/PBCH) blocks. Synchronization blocks may also be used when the UE 115 is in connected mode. The UE 115 may measure RSRP of one or more synchronization signals, RSRP of the PBCH, or a combination thereof. In some cases, multiple resources may be configured for the RLM reference signal resources. For example, the RLM reference signal resources may include synchronization signal blocks, CSI-RS ports, or both.

The UE 115 may determine downlink BLER estimates based on the RLM reference signal resources. If multiple RLM reference signal resources are used, the UE 115 may use the estimates with the best results. The BLER estimates may be based on a percentage of blocks which are successfully received. For example, if the UE 115 receives ten blocks, but two of the blocks are erroneous or undecodable, the UE 115 may determine a BLER estimate of 20%. In some cases, a transmitter may determine BLER based on feedback for a transmission. For example, if a receiver indicates an acknowledgment for 80% of the blocks and a negative acknowledgment for 20% of the blocks, this may correspond to a BLER of 20%. The receiver may determine BLER based on the percentage of successfully received blocks. In some cases, a transport block may be an example of the block used to estimate BLER.

The UE 115 may determine whether the UE 115 is in-sync or out-of-sync based on the BLER estimate. For example, if the downlink BLER is below a first threshold 310, the UE 115 may be considered in-sync. If the downlink BLER is above a second threshold 315, the UE 115 may be considered out-of-sync. The first threshold 310 and the second threshold 315 may be indicated to the UE 115 via RRC signaling, such as in system information blocks or via RRC reconfiguration. In some cases, the first threshold 310 may be referred to as Qin, and the second threshold 315 may be referred to as Qout.

The techniques described herein support a UE 115 to determine whether radio link failure has occurred based on an uplink error rate, such as an uplink BLER. For example, the BLER measurement 305 may be based on an uplink BLER, a downlink BLER, or both the uplink BLER and the downlink BLER. In some cases, the uplink BLER and the downlink BLER may be measured separately, where the BLER measurement 305 may be an example of either the uplink BLER or the downlink BLER. Additionally, or alternatively, the UE 115 may determine a BLER estimate from both the uplink BLER and the downlink BLER. In some cases, the uplink BLER may be estimated based on PUSCH transmissions from the UE 115. For example, the UE 115 may determine the uplink BLER based on feedback for PUSCH transmissions. These techniques may enable the UE 115 to declare radio link failure if the uplink BLER is too high, even if the downlink BLER is at appropriate level (e.g., the downlink BLER is below the Qout or below the Qin thresholds).

In an example, the UE 115 may determine the BLER measurement 305 over a period of time. The BLER measurements may begin under the first threshold 310, indicating that the UE 115 is in-sync. However, the BLER measurements may begin to increase and, at 320, the BLER measurement 305 may go above the second threshold 315. This may indicate that the UE 115 is out-of-sync. For example, the second threshold 315 may be 10%, and the UE 115 may determine that the BLER measurement 305 has surpassed 10% at 320. This may indicate that the UE 115 is out-of-sync.

Once the UE 115 is determined to be out-of-sync, the UE 115 may begin a timer to declare radio link failure. If the radio link conditions improve, and the UE 115 may go back in-sync before the timer expires, the UE 115 may not declare radio link failure. For example, the BLER measurement 305 may go below the first threshold 310 before the timer expires, and the UE 115 may stop the timer and not declare radio link failure. However, if the UE 115 does not return to in-sync before the timer expires, the UE 115 may declare radio link failure at 335.

In some cases, the UE 115 may begin the timer upon determining that the UE 115 is out-of-sync for radio link failure declarations based on uplink BLER. For example, if the BLER measurement 305 is above a threshold for a predetermined amount of time, the UE 115 may report cell group failure at 335.

If the UE 115 is determined to be out-of-sync based on downlink BLER estimates, a serving cell may transmit out-of-sync indications to the UE 115 starting at 325. The out-of-sync indications may be transmitted via CSI-RS or synchronization signal blocks. After the UE 115 receives a threshold number of out-of-sync indications, the UE 115 may begin the timer at 330 and wait for physical layer recovery. At 335, the timer may be expired, and the UE 115 may still be out-of-sync. Then, the UE 115 may declare radio link failure. In an example, a timer T310 may be an example of the timer which is started when the UE 115 is out-of-sync. In some cases, the same timer may be used to determine whether to declare radio link failure based on uplink BLER. Additionally, or alternatively, separate timers may be used to declare radio link failure for uplink BLER.

Figure 4:
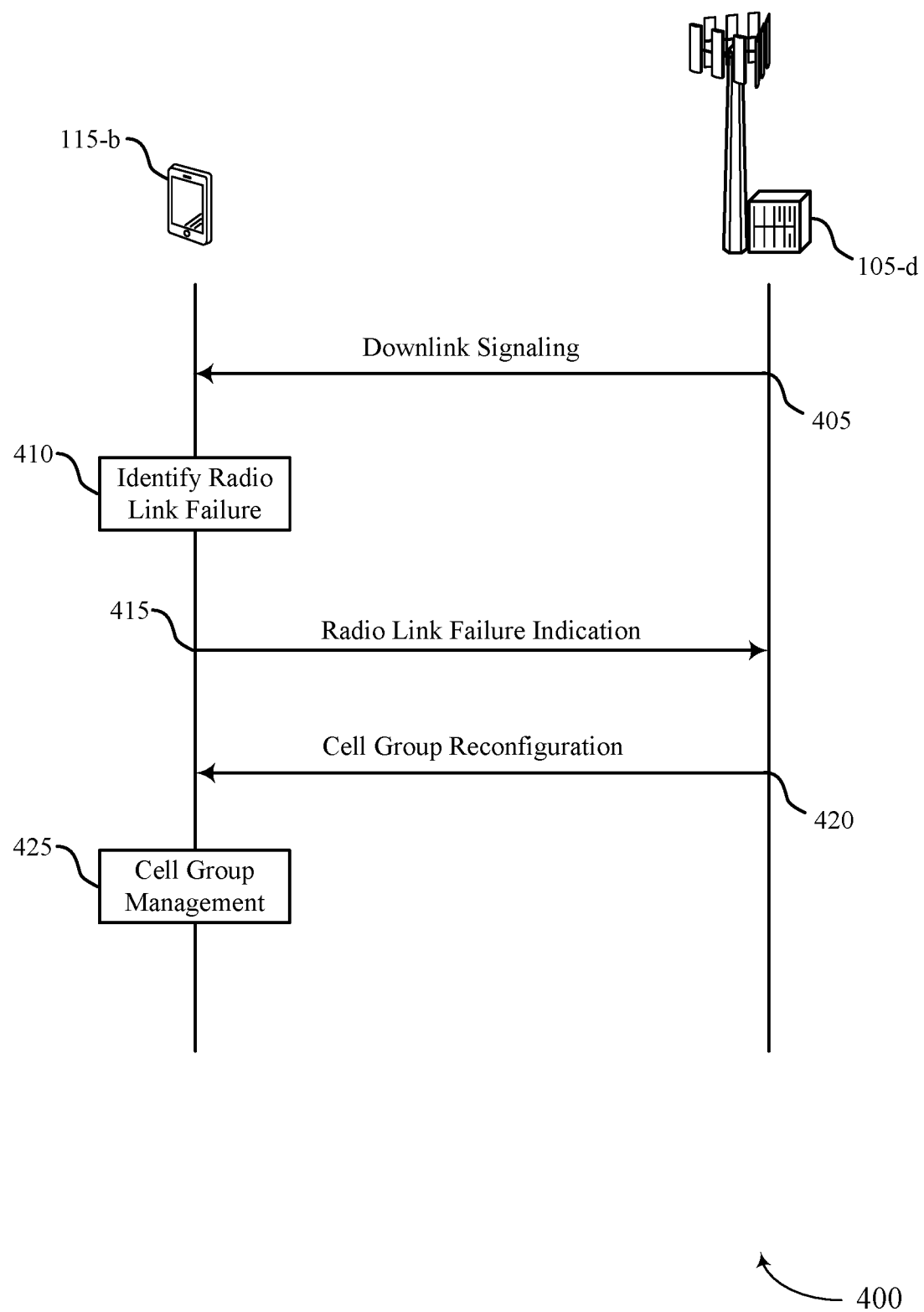
FIG. 4 illustrates an example of a process flow that supports uplink-based radio link failure reporting for a cell group in accordance with aspects of the present disclosure.

FIG. 4 illustrates an example of a process flow 400 that supports uplink-based radio link failure reporting for a cell group in accordance with aspects of the present disclosure. In some examples, the process flow 400 may implement aspects of wireless communications system 100. The process flow 400 may include UE 115-*b* and base station 105-*d*. UE 115-*b* and base station 105-*d* may be respective examples of a UE 115 and a base station 105 described with reference to FIGS. 1 and 2.

In some cases, uplink transmissions from UE 115-*b* to base station 105-*d* may have a high BLER (e.g., above a threshold for acceptable uplink error rate) while downlink transmissions have a low BLER (e.g., below a threshold for acceptable downlink error rate). In some cases, the high uplink BLER may be based on a high/mid radio frequency spectrum band link imbalance or based on uplink interference. The process flow 400 describes techniques for UE 115-*b* to indicate cell group failure and declare radio link failure based on an uplink error rate (e.g., uplink BLER or any other type of error rate associated with uplink transmissions or uplink channel quality). In some cases, UE 115-*b* may determine cell group failure for an SCG based on uplink BLER. UE 115-*b* may be configured for standalone operation or non-standalone operation.

At 405, UE 115-*b* may receive and uplink grant via downlink control signaling for a cell group. In some cases, the uplink grant may include feedback for previous uplink transmissions. For example, based on a new data indicator present in the uplink grant, UE 115-*b* may determine an error rate for previous uplink transmissions. In some cases, BLER may be an example of the error rate. For example, the error rate may indicate a percentage of uplink shared channel transmissions from UE 115-*b* which were erroneous or unsuccessfully received by the cell group. In some cases, physical uplink shared channel (PUSCH) BLER may be an example of the uplink BLER.

At 410, UE 115-*b* may identify a radio link failure condition for uplink based on an uplink error rate associated with the downlink control signaling exceeding an uplink error rate threshold. For example, the uplink BLER may be above an uplink BLER threshold, indicating that UE 115-*b* is out-of-sync. In another example, one or more requests or commands for increased transmit power may exceed a threshold, indicating that UE 115-*b* is out-of-sync. In some cases, the uplink error rate may be based on BLER or uplink feedback, or both. The uplink error rate threshold may be an example of an out-of-sync threshold, such as Qout, described with reference to FIG. 4. The out-of-sync threshold may be configured via RRC signaling.

In some examples, the radio link failure condition may be based on the uplink error rate exceeding the uplink error rate threshold for a configured amount of time. For example, upon determining that UE 115-*b* is out-of-sync and the uplink BLER is above the uplink error rate threshold, UE 115-*b* may begin a timer. If radio link conditions do not improve, and the uplink BLER does not go below an in-sync threshold before the timer expires, UE 115-*b* may determine that the radio link failure condition has been met.

UE 115-*b* may monitor radio link conditions for uplink signaling or downlink signaling, or both. These techniques may provide for UE 115-*b* to monitor radio link conditions for both communication directions. In some other wireless communications systems, a UE 115 may monitor downlink conditions, and a base station 105 may monitor uplink radio conditions. However, UE 115-*b*, and other UEs 115 described herein, may have greater granularity or flexibility for managing radio link conditions by monitoring both uplink and downlink conditions. For example, UE 115-*b* may monitor uplink radio link conditions based on an uplink error rate, downlink radio link conditions based on a downlink error rate, or both. In some cases, the uplink radio link may be broken, but the downlink radio link may have acceptable conditions. In some other examples, UE 115-*b* may separately determine that both the uplink radio link and the downlink radio link are failing. In some cases, UE 115-*b* may determine downlink radio link conditions (e.g., whether to declare radio link failure for downlink) based on uplink radio link conditions.

At 415, UE 115-*b* may transmit a radio link failure indication indicating that the radio link failure condition is based on the uplink error rate. For example, the radio link failure indication may include a field or parameter for a "cause" of the radio link failure. UE 115-*b* may include an indicator that the radio link failure declaration is caused by the uplink error rate exceeding the uplink error rate threshold. In some cases, the indicator may indicate that the uplink error rate has exceeded the uplink error rate threshold for the configured amount of time. In some cases, the radio link failure declaration may indicate cell group failure for the cell group with high uplink error rate.

The radio link failure condition may be based on the uplink error rate, a downlink error rate, or both. For example, UE 115-b may consider both downlink and uplink BLER for cell group failure reporting. If either uplink BLER or downlink BLER is above a threshold for a preconfigured amount of time, UE 115-b may report cell group failure and indicate the causes (e.g., uplink radio failure, downlink radio failure, or both uplink and downlink radio failure). Uplink BLER and downlink BLER may have the same or separate thresholds and timers. For example, Qin and Qout, used to determine whether a UE 115 is in-sync or out-of-sync based on PDCCH BLER, may be used to determine whether the UE 115 is in-sync or out-of-sync based on uplink BLER Or, the UE 115 may be configured (e.g., via RRC signaling) with different thresholds for determining whether the UE 115 is in-sync or out-of-sync based on uplink BLER.

At 420, base station 105-d may transmit, to UE 115-b, a cell group reconfiguration message to release the cell group for UE 115-b (e.g., a first cell group for UE 115-b). In some cases, the cell group reconfiguration message may be an RRC message, such as an RRC connection reconfiguration message. In some examples, the cell group reconfiguration message may reconfigure UE 115-b for another cell group. For example, UE 115-b may release the cell group based on the cell group reconfiguration message, and UE 115-b may connect to another cell group. In some cases, UE 115-b may perform cell group management at 425, which may include releasing the cell group and, in some cases, reconnecting to another cell group.

After reporting uplink cell group failure and releasing the cell group, UE 115-b may refrain from performing measurements for radio link failure or refrain from reporting measurements for a period of time. In some cases, the network may delay configuring measurements and reporting. Additionally, or alternatively, UE 115-b may delay or stop sending measurement reports based on the previous cell group failure. In some cases, base station 105-d may transmit a request for UE 115-b to refrain from performing, or reporting, measurements for some cell groups (e.g., secondary cell groups) after sending the cell group reconfiguration message at 420. In some cases, after UE 115-b reports the radio link failure at 415, UE 115-b may refrain from performing measurements for the failed cell group for a period of time.

The process flow 400 shows signaling, such as the cell group reconfiguration message, from base station 105-d. Base station 105-d may provide cells of, or be an example of, an MCG. In some cases, base station 105-d may be an example of a transmission/reception point of an SCG. In some cases, base station 105-d may be an example of a transmission/reception point of a network device, which may convey cell group configuration information for UE 115-b. In some cases, UE 115-b may report the radio link failure indication to a first device and receive the cell group reconfiguration message from another device. For example, UE 115-b may transmit the radio link failure indication on an MCG and receive the cell group reconfiguration message via the SCG.

Figure 5:
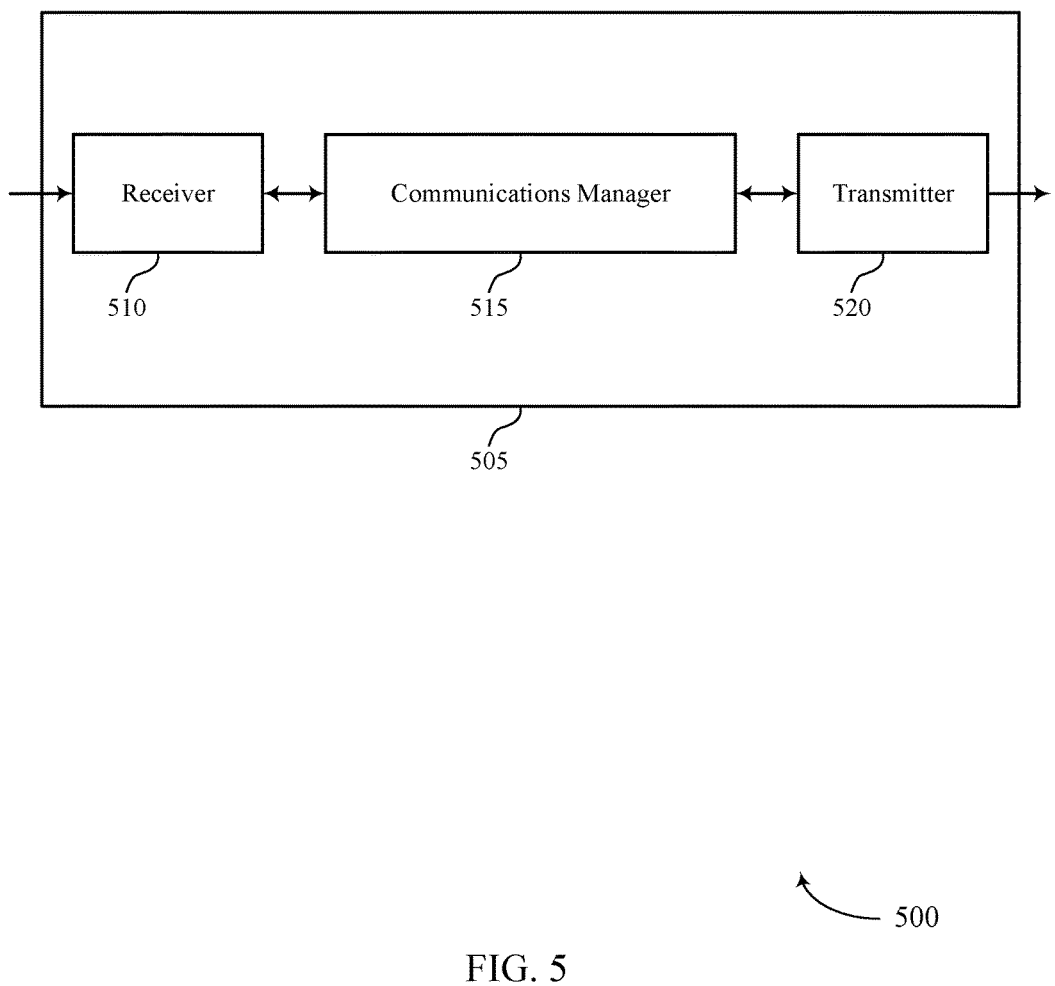
FIGS. 5 and 6 show block diagrams of devices that support uplink-based radio link failure reporting for a cell group in accordance with aspects of the present disclosure.

FIG. 5 shows a block diagram 500 of a device 505 that supports uplink-based radio link failure reporting for a cell group in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink-based radio link failure reporting for a cell group, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive an uplink grant via downlink control signaling for a cell group, identify a radio link failure condition for uplink based on an uplink error rate associated with the downlink control signaling exceeding an uplink error rate threshold, and transmit a radio link failure indication indicating that the radio link failure condition is based on the uplink error rate. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 515 as described herein may be implemented to realize one or more potential advantages. One implementation may allow a UE 115 to save power and increase battery life by quickly releasing cell with radio link failure. In some cases, the UE 115 may be reconfigured with another cell to boost throughput for the UE 115, or the UE 115 may be scheduled using other cell groups instead of the released cell group. The UE 115 may avoid staying on a cell group with high uplink BLER, even if the cell group has low downlink BLER.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
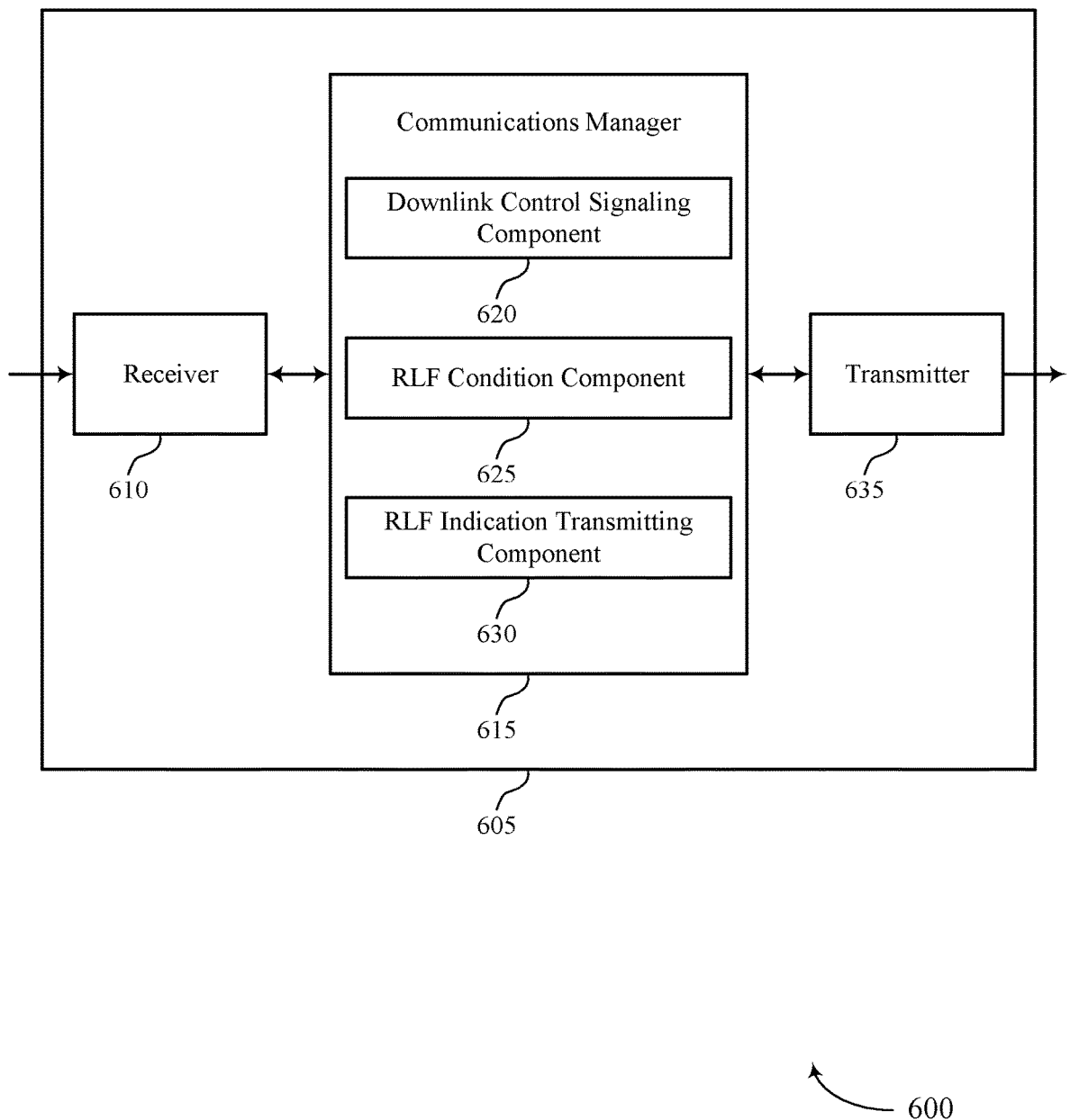

FIG. 6 shows a block diagram 600 of a device 605 that supports uplink-based radio link failure reporting for a cell group in accordance with aspects of the present disclosure.

The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink-based radio link failure reporting for a cell group, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a downlink control signaling component 620, an RLF condition component 625, and an RLF indication transmitting component 630. The communications manager 615 may be an example of aspects of the communications manager 810 described herein.

The downlink control signaling component 620 may receive an uplink grant via downlink control signaling for a cell group. The RLF condition component 625 may identify a radio link failure condition for uplink based on an uplink error rate associated with the downlink control signaling exceeding an uplink error rate threshold. The RLF indication transmitting component 630 may transmit a radio link failure indication indicating that the radio link failure condition is based on the uplink error rate.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
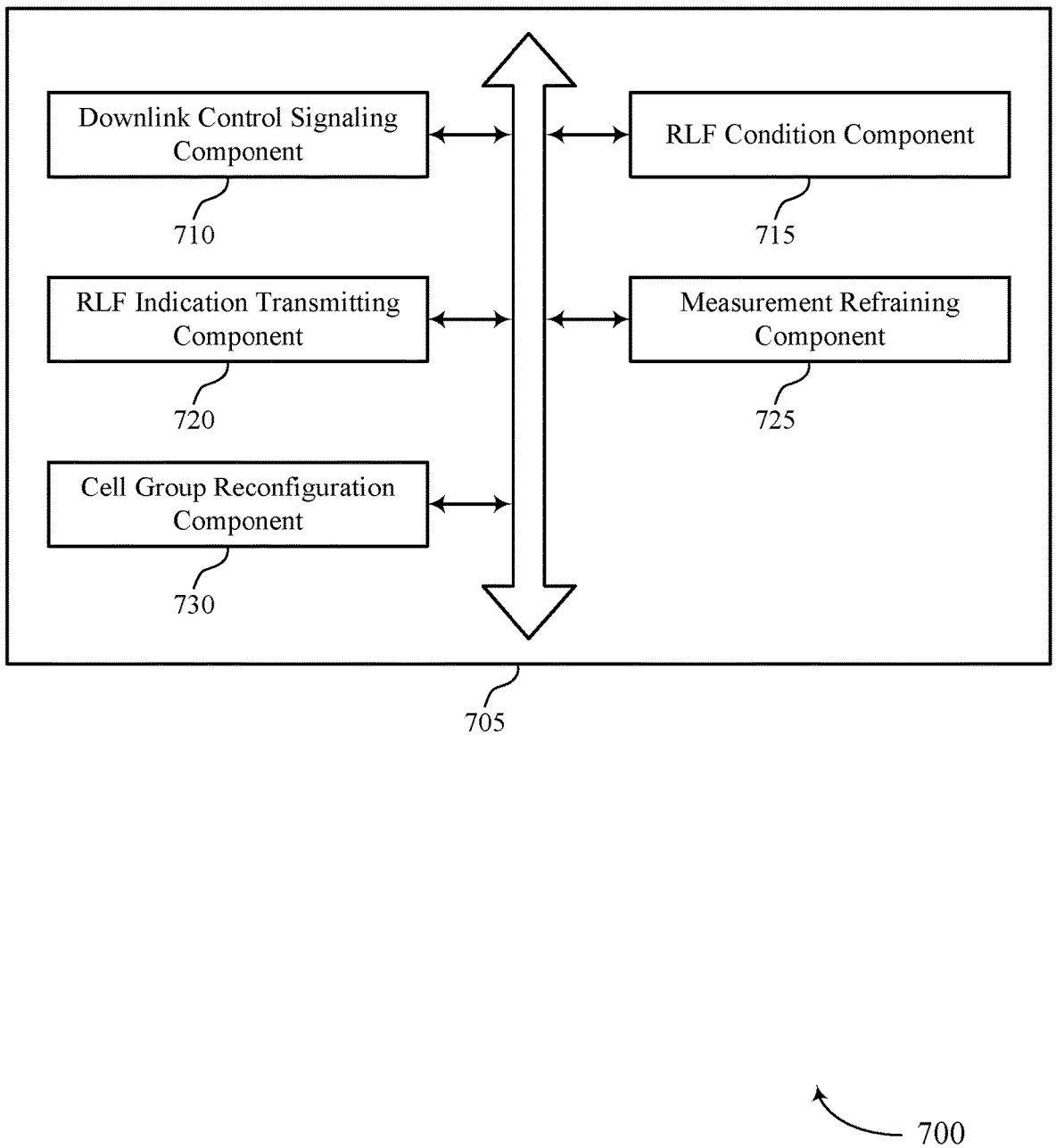
FIG. 7 shows a block diagram of a communications manager that supports uplink-based radio link failure reporting for a cell group in accordance with aspects of the present disclosure.

FIG. 7 shows a block diagram 700 of a communications manager 705 that supports uplink-based radio link failure reporting for a cell group in accordance with aspects of the present disclosure. The communications manager 705 may be an example of aspects of a communications manager 515, a communications manager 615, or a communications manager 810 described herein. The communications manager 705 may include a downlink control signaling component 710, an RLF condition component 715, an RLF indication transmitting component 720, a measurement refraining component 725, and a cell group reconfiguration component 730. Each of these modules may communicate, directly or indirectly, with one another (e.g., via one or more buses).

The downlink control signaling component 710 may receive an uplink grant via downlink control signaling for a cell group. The RLF condition component 715 may identify a radio link failure condition for uplink based on an uplink error rate associated with the downlink control signaling exceeding an uplink error rate threshold.

In some examples, the RLF condition component 715 may determine that a downlink error rate associated with the cell group exceeds a downlink error rate threshold. In some examples, the RLF condition component 715 may determine the uplink error rate exceeds the uplink error rate threshold for a period of time, where the radio link failure indication is transmitted based on the determining. In some cases, the cell group is a secondary cell group. In some cases, the UE is configured for standalone communications or non-standalone communications. In some cases, the uplink error rate may be based on BLER (e.g., uplink BLER) or uplink feedback, or both.

The RLF indication transmitting component 720 may transmit a radio link failure indication indicating that the radio link failure condition is based on the uplink error rate. The measurement refraining component 725 may refrain from performing measurements for radio link failure or transmitting another radio link failure indication for a delay period based on transmitting the radio link failure indication.

In some examples, the measurement refraining component 725 may receive a request to refrain from performing measurements for radio link failure or transmitting another radio link failure indication for a delay period based on transmitting the radio link failure indication. In some examples, the measurement refraining component 725 may refrain from transmitting a measurement report for the cell group after transmitting the radio link failure indication.

The cell group reconfiguration component 730 may receive a cell group reconfiguration message based on transmitting the radio link failure indication. In some examples, the cell group reconfiguration component 730 may release the cell group based on the cell group reconfiguration message. In some examples, the cell group reconfiguration component 730 may connect to another cell group indicated by the cell group reconfiguration message. In some cases, the cell group reconfiguration message is a radio resource control connection reconfiguration message.

Figure 8:
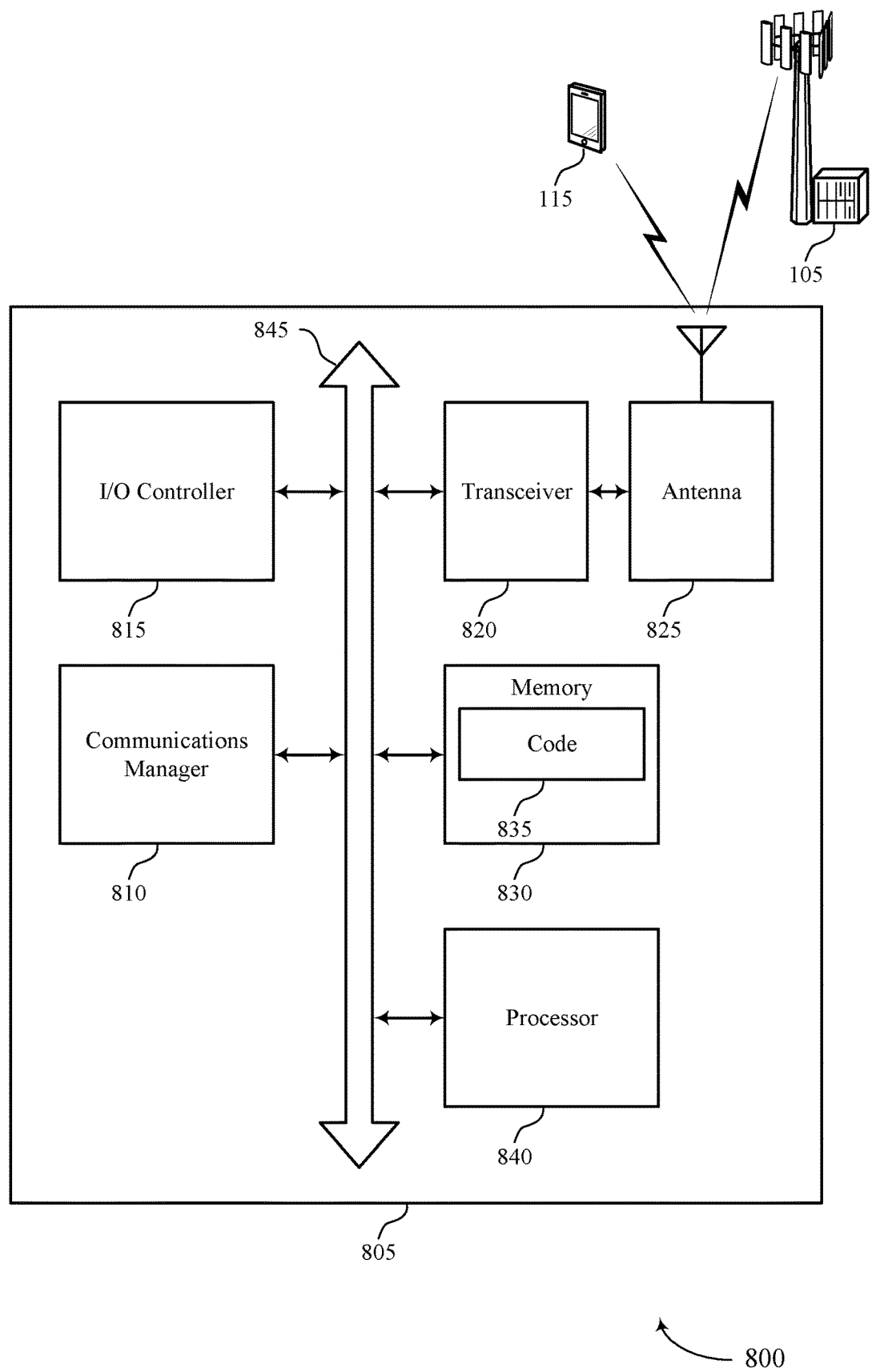
FIG. 8 shows a diagram of a system including a device that supports uplink-based radio link failure reporting for a cell group in accordance with aspects of the present disclosure.

FIG. 8 shows a diagram of a system 800 including a device 805 that supports uplink-based radio link failure reporting for a cell group in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an uplink grant via downlink control signaling for a cell group, identify a radio link failure condition for uplink based on an uplink error rate associated with the downlink control signaling exceeding an uplink error rate threshold, and transmit a radio link failure indication indicating that the radio link failure condition is based on the uplink error rate.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink-based radio link failure reporting for a cell group).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Based on transmitting the radio link failure indication for a cell group, a processor of a UE 115 (e.g., controlling the receiver 510 or the transmitter 520 as described with reference to FIG. 5, or the transceiver 820) the UE 115 may receive a release for the cell group. The UE 115 may then not be scheduled for communications on the failing cell group, and the processor may not be preparing transmissions for a failed cell group. This may reduce the number of retransmissions generated and transmitted on the transceiver 820, reducing power consumption at the device and improving power efficiency to successfully send messages from the device.

Figure 9:
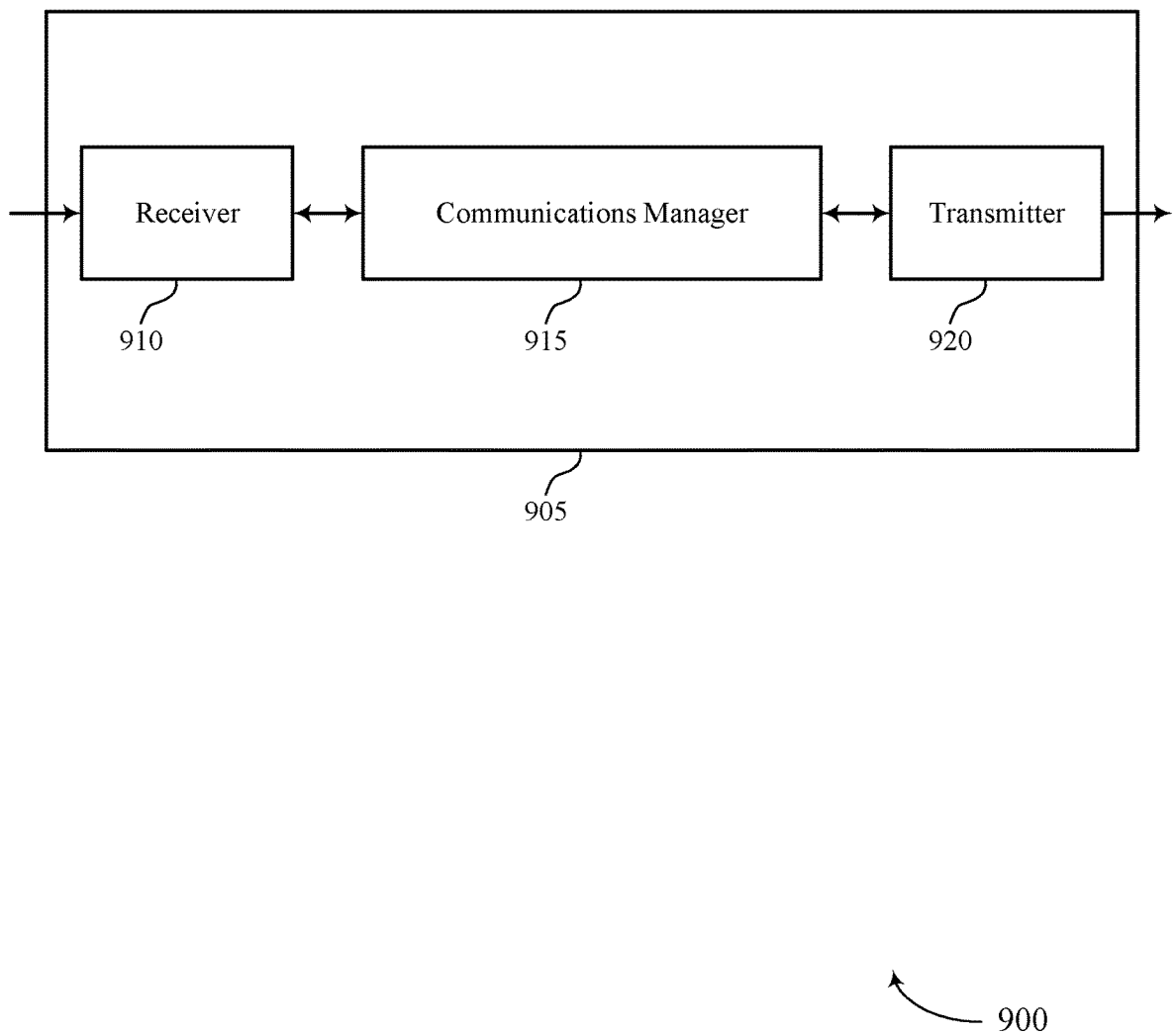
FIGS. 9 and 10 show block diagrams of devices that support uplink-based radio link failure reporting for a cell group in accordance with aspects of the present disclosure.

FIG. 9 shows a block diagram 900 of a device 905 that supports uplink-based radio link failure reporting for a cell group in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink-based radio link failure reporting for a cell group, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a radio link failure indication for uplink from a UE indicating that an uplink error rate associated with a first cell group configured for the UE exceeded an uplink error rate threshold and transmit, to the UE, a cell group reconfiguration message to release the first cell group configured for the UE and reconfigure a second cell group for the UE based on the radio link failure indication. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
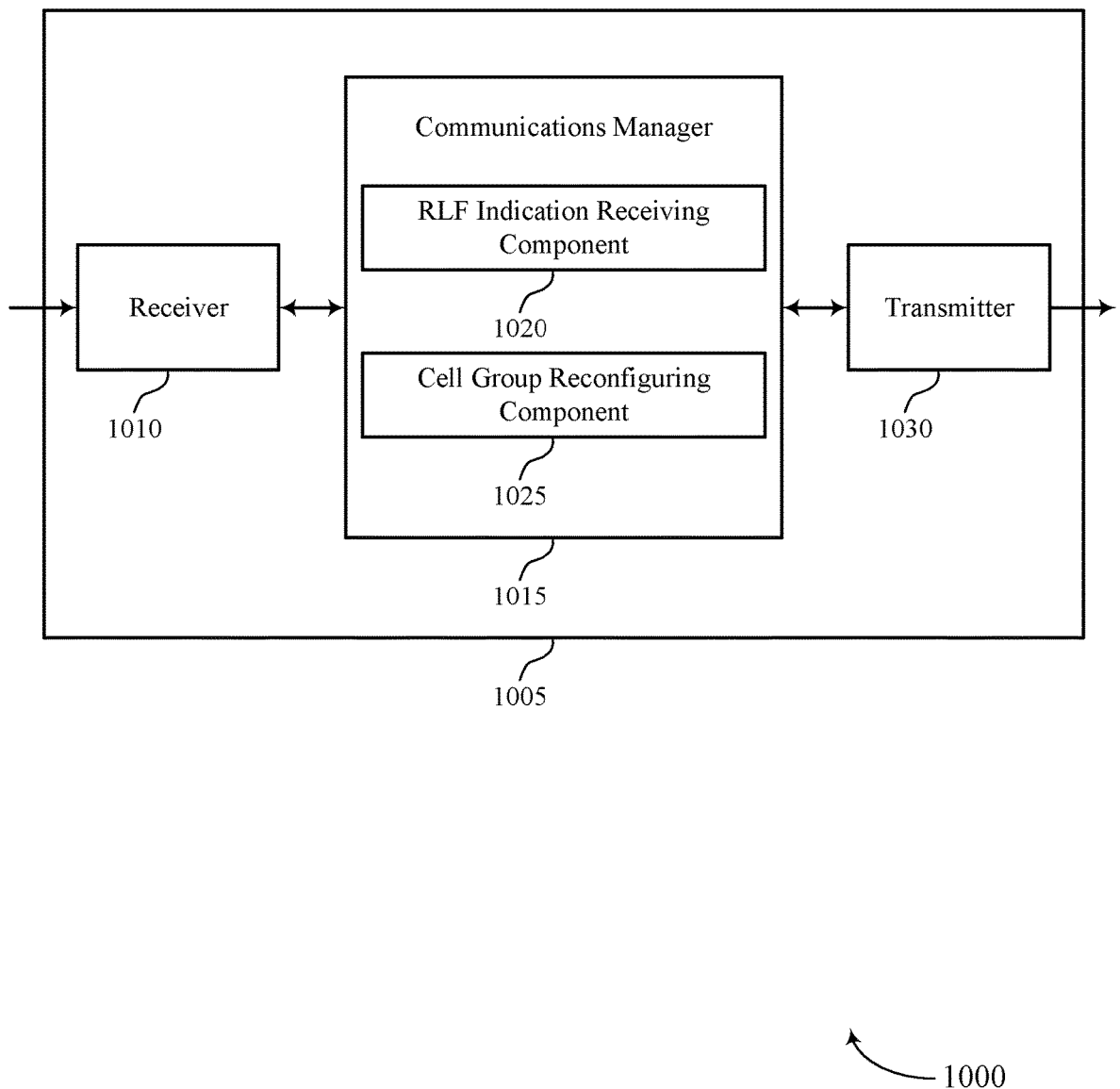

FIG. 10 shows a block diagram 1000 of a device 1005 that supports uplink-based radio link failure reporting for a cell group in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink-based radio link failure reporting for a cell group, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an RLF indication receiving component 1020 and a cell group reconfiguring component 1025. The communications manager 1015 may be an example of aspects of the communications manager 1210 described herein.

The RLF indication receiving component 1020 may receive a radio link failure indication for uplink from a UE indicating that an uplink error rate associated with a first cell group configured for the UE exceeded an uplink error rate threshold.

The cell group reconfiguring component 1025 may transmit, to the UE, a cell group reconfiguration message to release the first cell group configured for the UE and reconfigure a second cell group for the UE based on the radio link failure indication.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
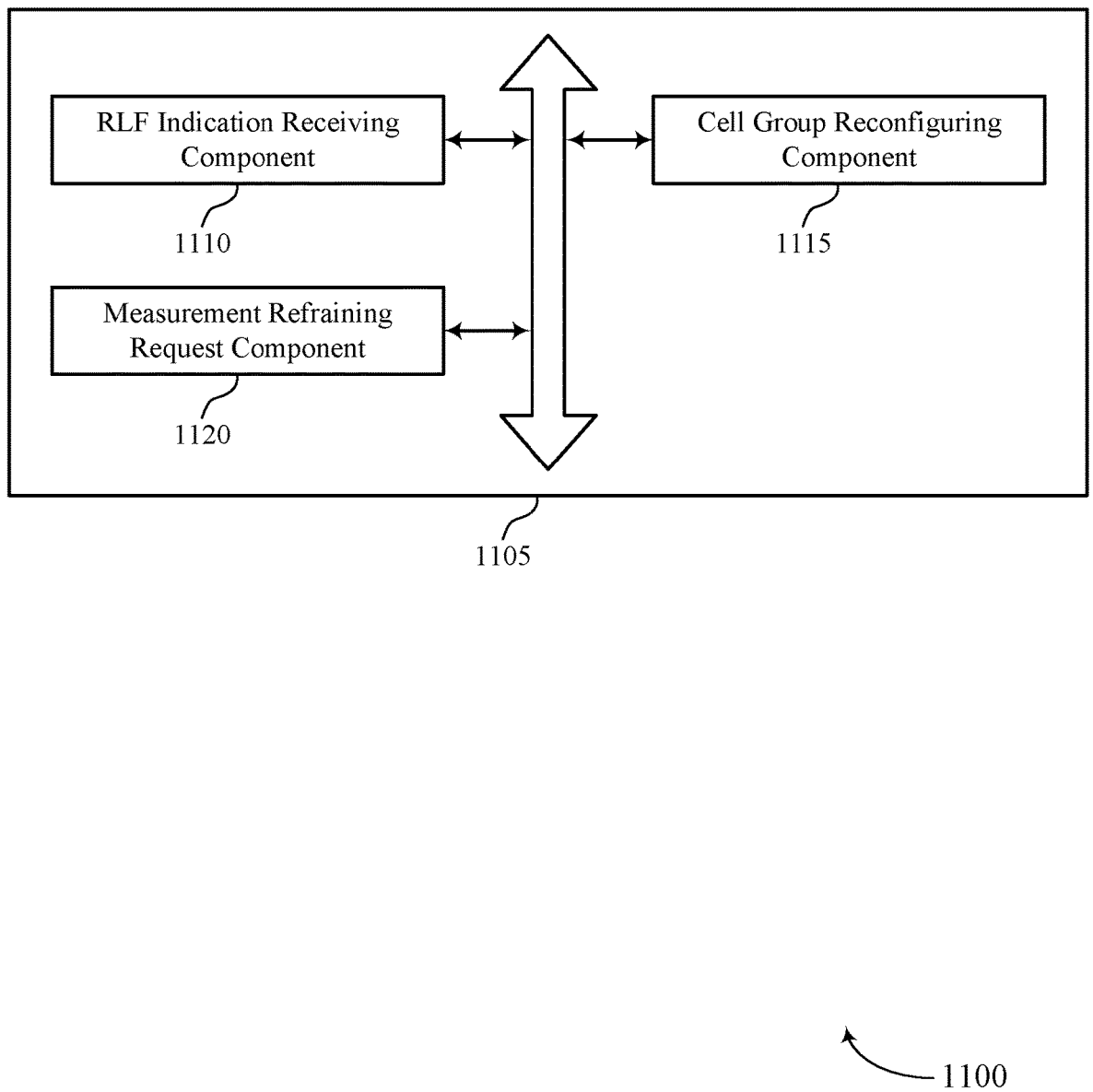
FIG. 11 shows a block diagram of a communications manager that supports uplink-based radio link failure reporting for a cell group in accordance with aspects of the present disclosure.

FIG. 11 shows a block diagram 1100 of a communications manager 1105 that supports uplink-based radio link failure reporting for a cell group in accordance with aspects of the present disclosure. The communications manager 1105 may be an example of aspects of a communications manager 915, a communications manager 1015, or a communications manager 1210 described herein. The communications manager 1105 may include an RLF indication receiving component 1110, a cell group reconfiguring component 1115, and a measurement refraining request component 1120. Each of these modules may communicate, directly or indirectly, with one another (e.g., via one or more buses).

The RLF indication receiving component 1110 may receive a radio link failure indication for uplink from a UE indicating that an uplink error rate associated with a first cell group configured for the UE exceeded an uplink error rate threshold. In some examples, the RLF indication receiving component 1110 may determine, based on the radio link failure indication, that a downlink error rate associated with the first cell group exceeds a downlink error rate threshold, where the cell group reconfiguration message is transmitted based on the downlink error rate exceeding the downlink error rate threshold.

In some examples, the RLF indication receiving component 1110 may configure the UE for standalone communications or non-standalone communications. In some cases, the first cell group is a secondary cell group.

The cell group reconfiguring component 1115 may transmit, to the UE, a cell group reconfiguration message to release the first cell group configured for the UE and reconfigure a second cell group for the UE based on the radio link failure indication. In some cases, the cell group reconfiguration message includes a radio resource control connection reconfiguration message.

The measurement refraining request component 1120 may transmit a request for the UE to refrain from measuring radio link failure or transmitting another radio link failure indication for a delay period based on receiving the radio link failure indication. In some examples, the measurement refraining request component 1120 may configure the UE to refrain from transmitting a measurement report for the first cell group based on the UE transmitting the radio link failure indication.

Figure 12:
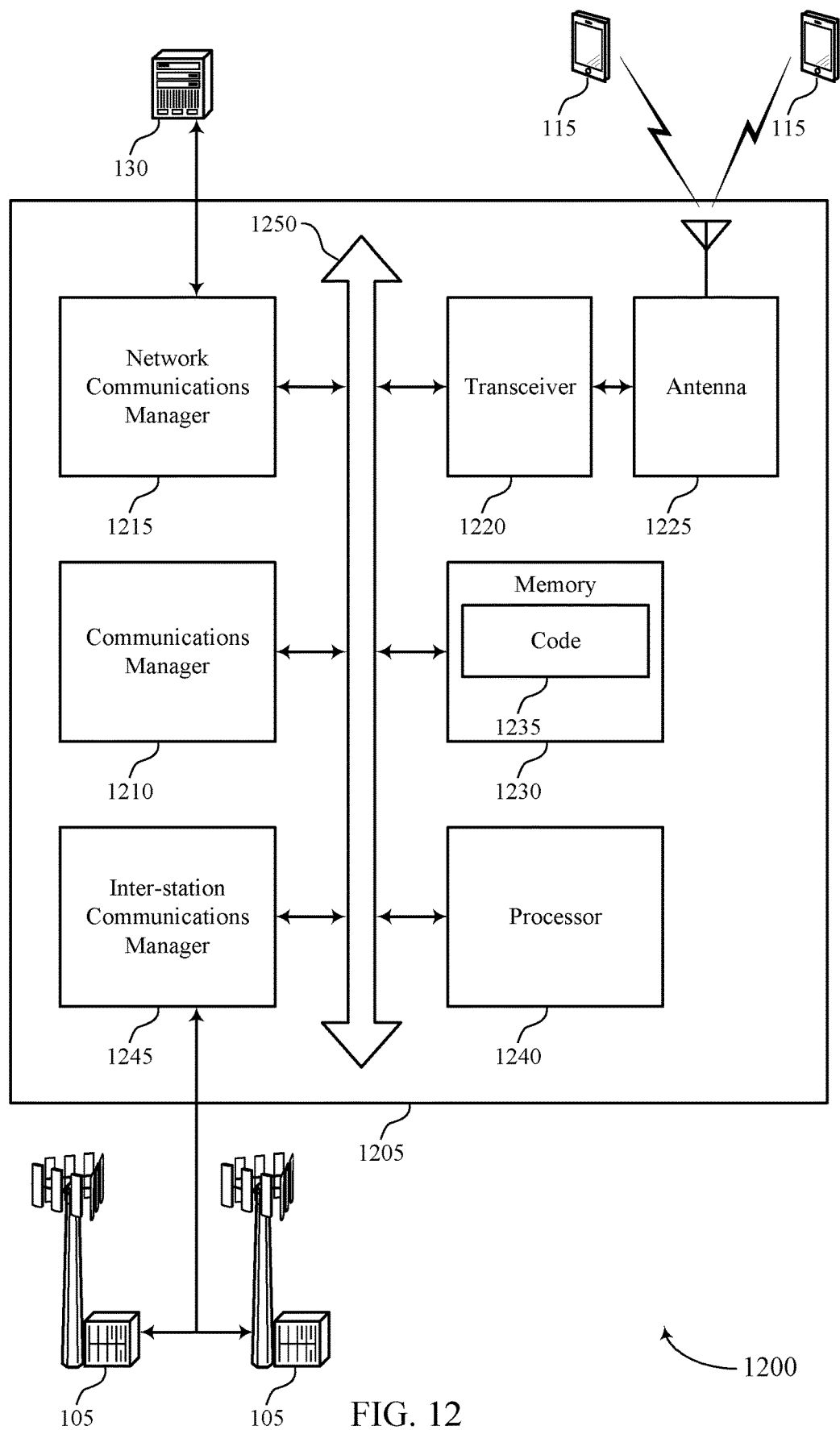
FIG. 12 shows a diagram of a system including a device that supports uplink-based radio link failure reporting for a cell group in accordance with aspects of the present disclosure.

FIG. 12 shows a diagram of a system 1200 including a device 1205 that supports uplink-based radio link failure reporting for a cell group in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a radio link failure indication for uplink from a UE indicating that an uplink error rate associated with a first cell group configured for the UE exceeded an uplink error rate threshold and transmit, to the UE, a cell group reconfiguration message to release the first cell group configured for the UE and reconfigure a second cell group for the UE based on the radio link failure indication.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink-based radio link failure reporting for a cell group).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
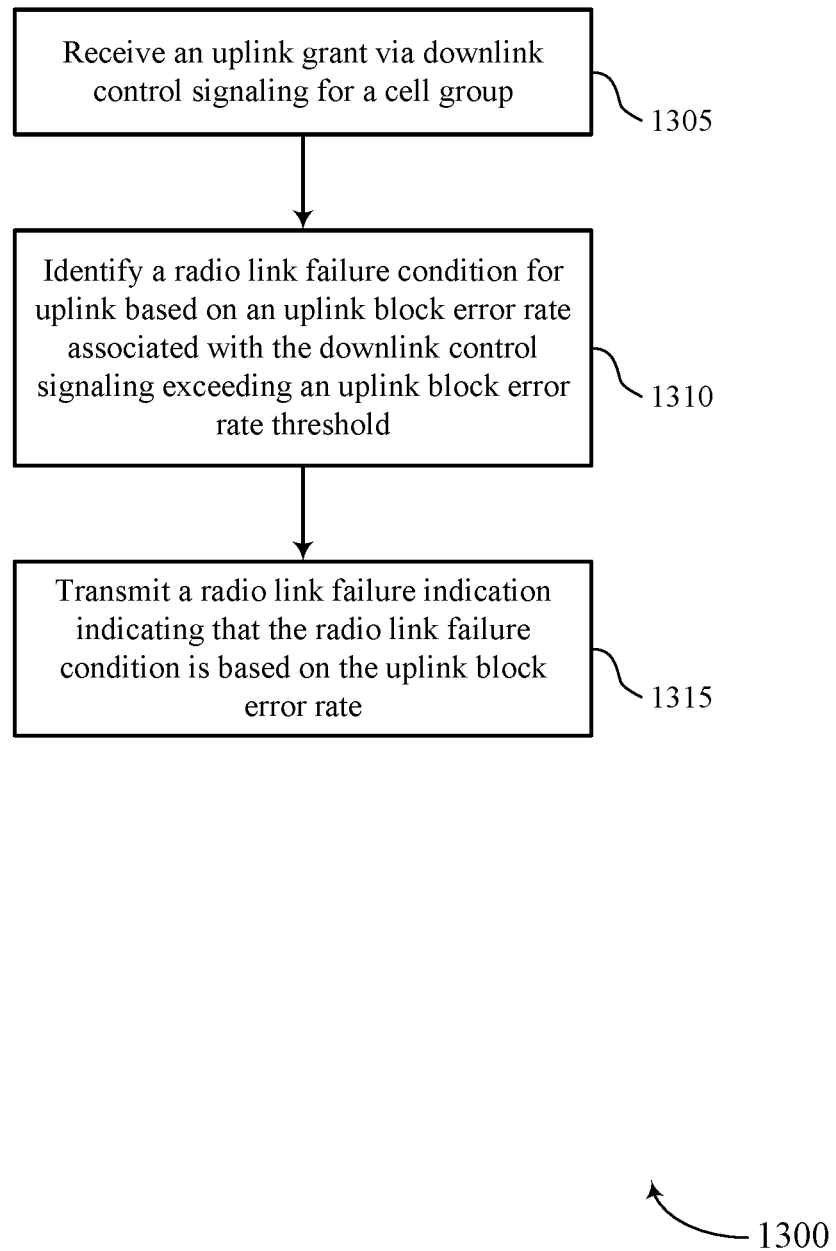
FIGS. 13 through 17 show flowcharts illustrating methods that support uplink-based radio link failure reporting for a cell group in accordance with aspects of the present disclosure.

FIG. 13 shows a flowchart illustrating a method 1300 that supports uplink-based radio link failure reporting for a cell group in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive an uplink grant via downlink control signaling for a cell group. The operations of 1305 may be performed according to the methods described herein. In some examples, aspects of the operations of 1305 may be performed by a downlink control signaling component as described with reference to FIGS. 5 through 8.

At 1310, the UE may identify a radio link failure condition for uplink based on an uplink error rate associated with the downlink control signaling exceeding an uplink error rate threshold. The operations of 1310 may be performed according to the methods described herein. In some examples, aspects of the operations of 1310 may be performed by an RLF condition component as described with reference to FIGS. 5 through 8.

At 1315, the UE may transmit a radio link failure indication indicating that the radio link failure condition is based on the uplink error rate. The operations of 1315 may be performed according to the methods described herein. In some examples, aspects of the operations of 1315 may be performed by an RLF indication transmitting component as described with reference to FIGS. 5 through 8.

Figure 14:
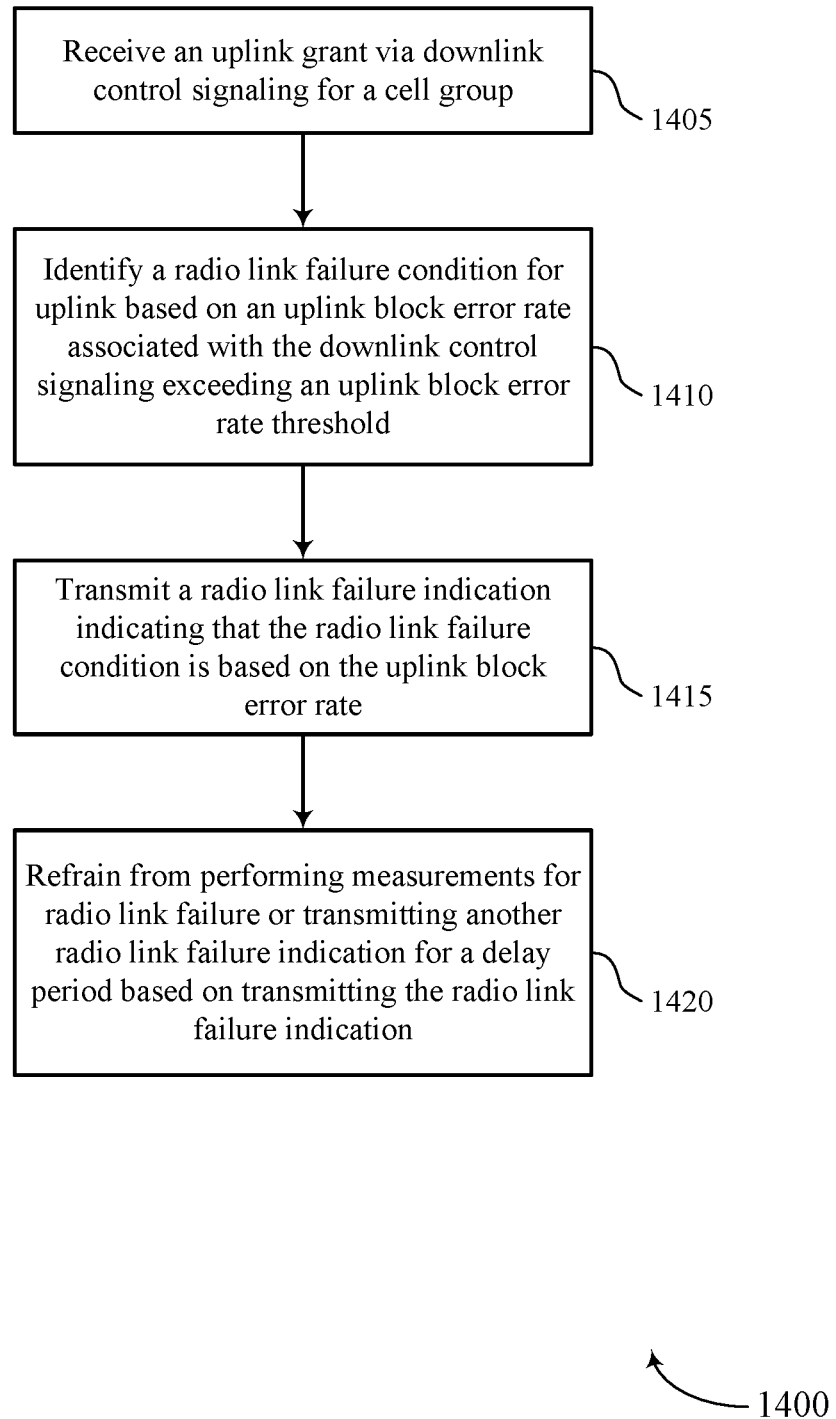

FIG. 14 shows a flowchart illustrating a method 1400 that supports uplink-based radio link failure reporting for a cell group in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive an uplink grant via downlink control signaling for a cell group. The operations of 1405 may be performed according to the methods described herein. In some examples, aspects of the operations of 1405 may be performed by a downlink control signaling component as described with reference to FIGS. 5 through 8.

At 1410, the UE may identify a radio link failure condition for uplink based on an uplink error rate associated with the downlink control signaling exceeding an uplink error rate threshold. The operations of 1410 may be performed according to the methods described herein. In some examples, aspects of the operations of 1410 may be performed by an RLF condition component as described with reference to FIGS. 5 through 8.

At 1415, the UE may transmit a radio link failure indication indicating that the radio link failure condition is based on the uplink error rate. The operations of 1415 may be performed according to the methods described herein. In some examples, aspects of the operations of 1415 may be performed by an RLF indication transmitting component as described with reference to FIGS. 5 through 8.

At 1420, the UE may refrain from performing measurements for radio link failure or transmitting another radio link failure indication for a delay period based on transmitting the radio link failure indication. The operations of 1420 may be performed according to the methods described herein. In some examples, aspects of the operations of 1420 may be performed by a measurement refraining component as described with reference to FIGS. 5 through 8.

Figure 15:
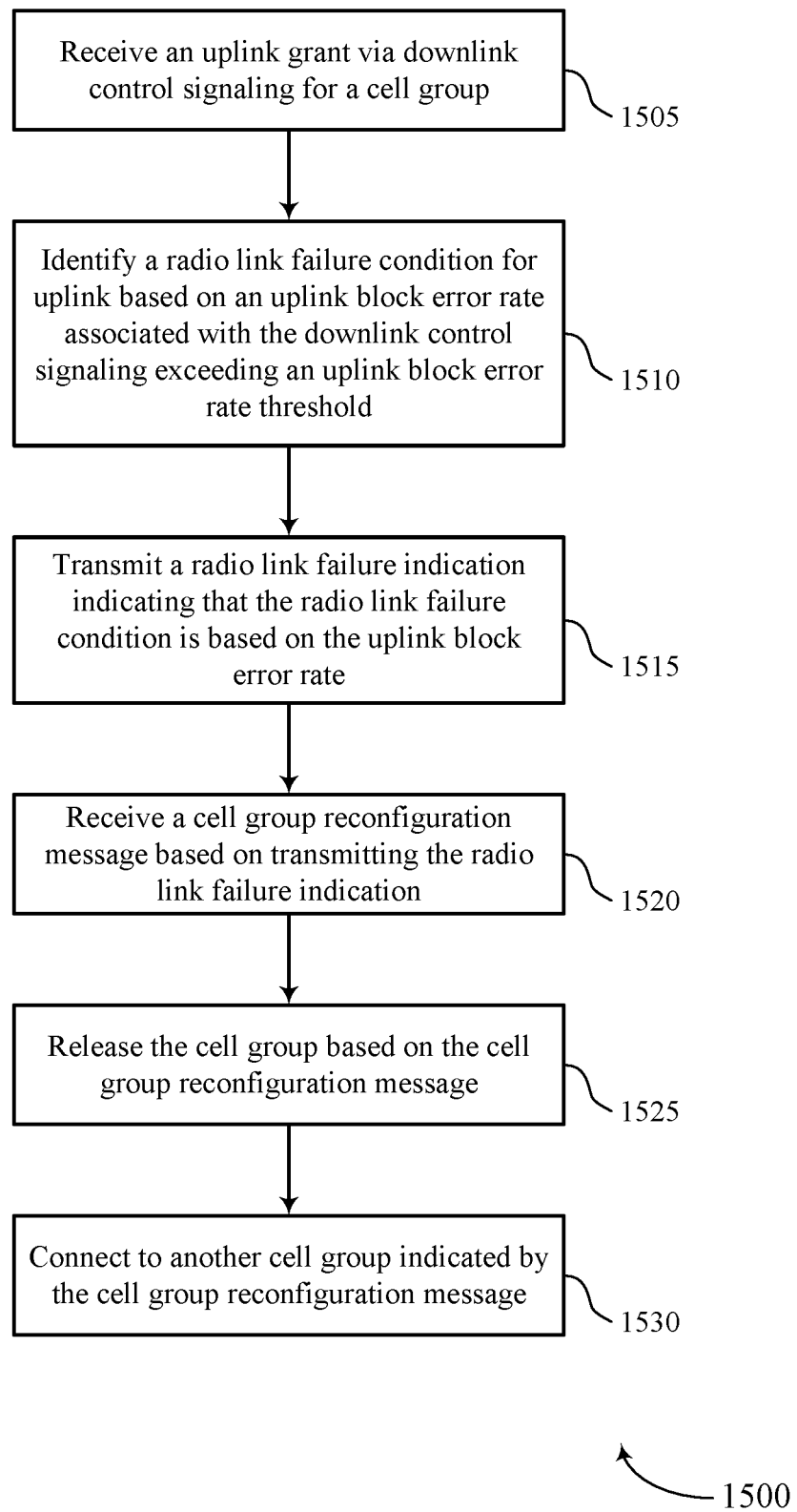

FIG. 15 shows a flowchart illustrating a method 1500 that supports uplink-based radio link failure reporting for a cell group in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive an uplink grant via downlink control signaling for a cell group. The operations of 1505 may be performed according to the methods described herein. In some examples, aspects of the operations of 1505 may be performed by a downlink control signaling component as described with reference to FIGS. 5 through 8.

At 1510, the UE may identify a radio link failure condition for uplink based on an uplink error rate associated with the downlink control signaling exceeding an uplink error rate threshold. The operations of 1510 may be performed according to the methods described herein. In some examples, aspects of the operations of 1510 may be performed by an RLF condition component as described with reference to FIGS. 5 through 8.

At 1515, the UE may transmit a radio link failure indication indicating that the radio link failure condition is based on the uplink error rate. The operations of 1515 may be performed according to the methods described herein. In some examples, aspects of the operations of 1515 may be performed by an RLF indication transmitting component as described with reference to FIGS. 5 through 8.

At 1520, the UE may receive a cell group reconfiguration message based on transmitting the radio link failure indication. The operations of 1520 may be performed according to the methods described herein. In some examples, aspects of the operations of 1520 may be performed by a cell group reconfiguration component as described with reference to FIGS. 5 through 8.

At 1525, the UE may release the cell group based on the cell group reconfiguration message. The operations of 1525 may be performed according to the methods described herein. In some examples, aspects of the operations of 1525 may be performed by a cell group reconfiguration component as described with reference to FIGS. 5 through 8.

At 1530, the UE may connect to another cell group indicated by the cell group reconfiguration message. The operations of 1530 may be performed according to the methods described herein. In some examples, aspects of the operations of 1530 may be performed by a cell group reconfiguration component as described with reference to FIGS. 5 through 8.

Figure 16:
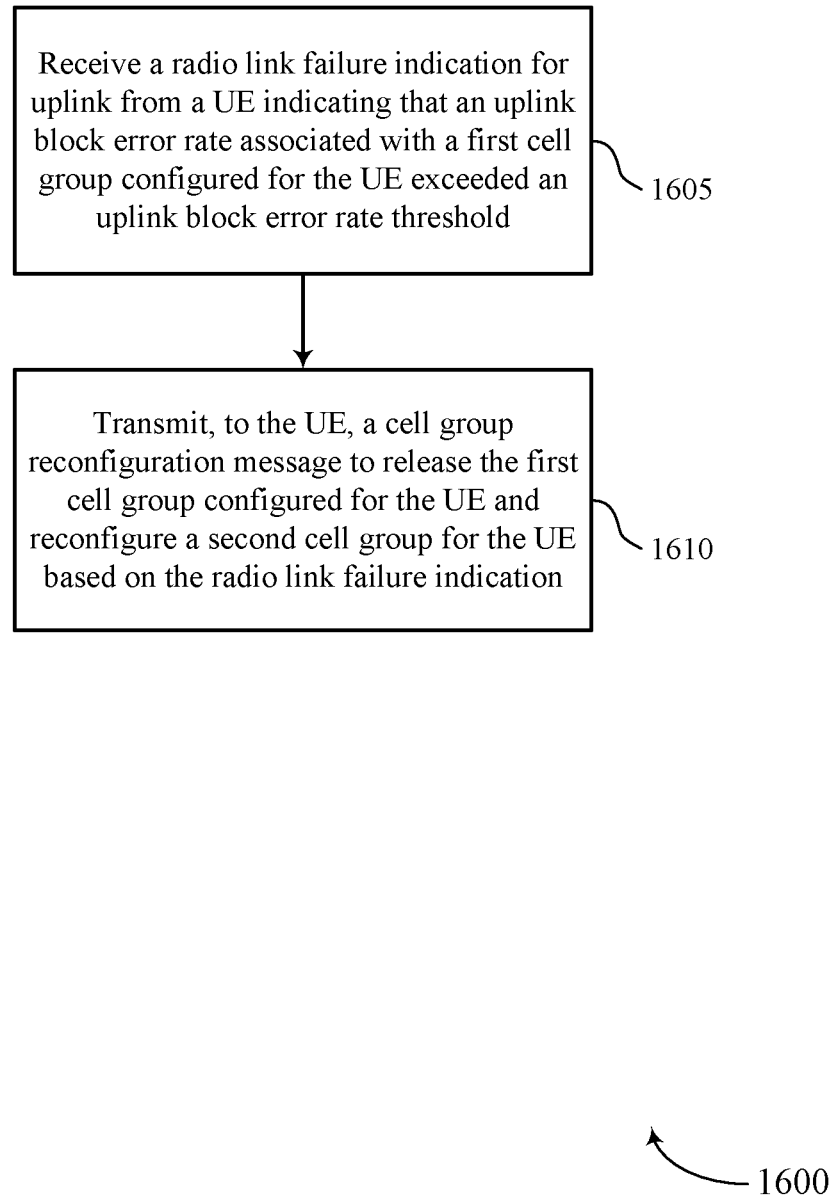

FIG. 16 shows a flowchart illustrating a method 1600 that supports uplink-based radio link failure reporting for a cell group in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive a radio link failure indication for uplink from a UE indicating that an uplink error rate associated with a first cell group configured for the UE exceeded an uplink error rate threshold. The operations of 1605 may be performed according to the methods described herein. In some examples, aspects of the operations of 1605 may be performed by an RLF indication receiving component as described with reference to FIGS. 9 through 12.

At 1610, the base station may transmit, to the UE, a cell group reconfiguration message to release the first cell group configured for the UE and reconfigure a second cell group for the UE based on the radio link failure indication. The operations of 1610 may be performed according to the methods described herein. In some examples, aspects of the operations of 1610 may be performed by a cell group reconfiguring component as described with reference to FIGS. 9 through 12.

Figure 17:
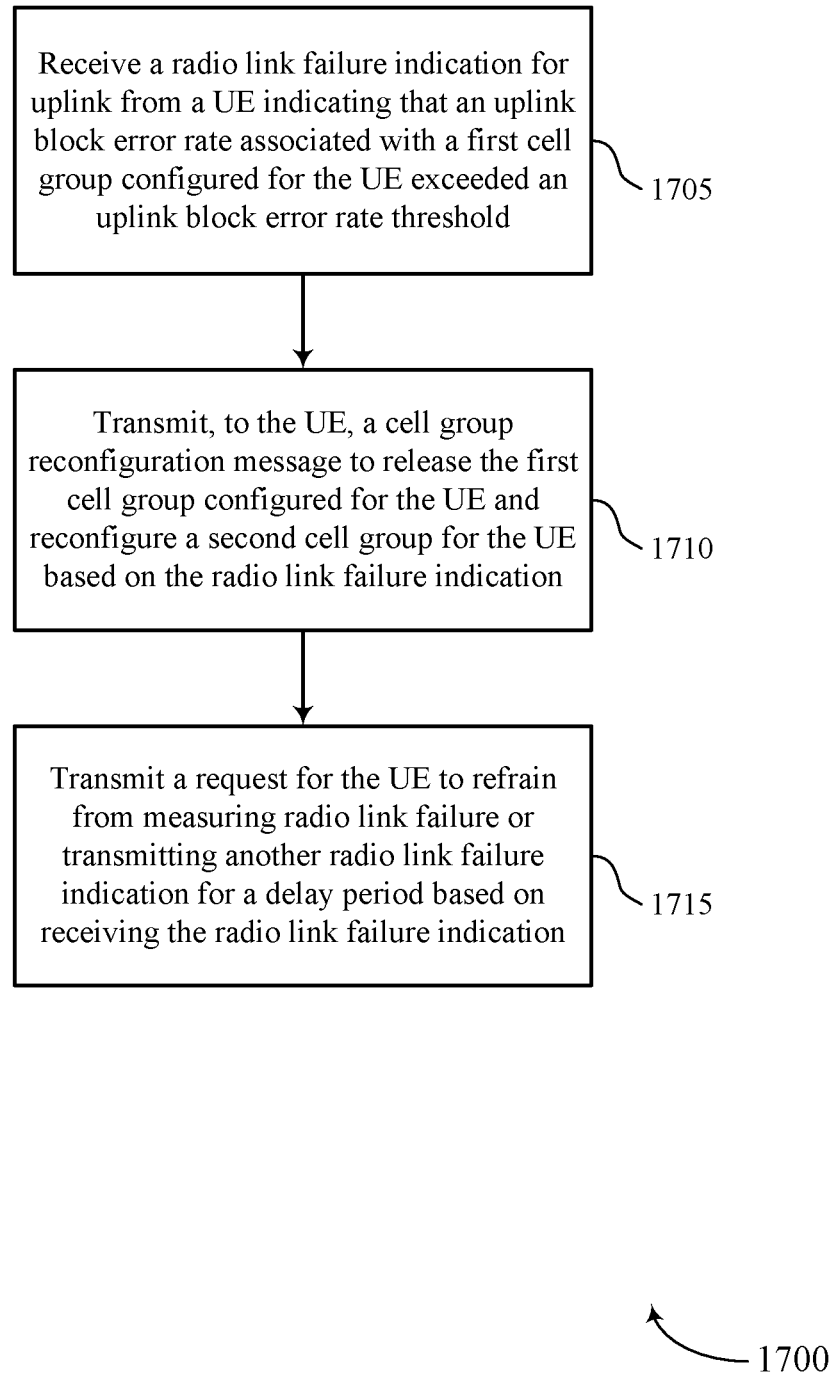

FIG. 17 shows a flowchart illustrating a method 1700 that supports uplink-based radio link failure reporting for a cell group in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive a radio link failure indication for uplink from a UE indicating that an uplink error rate associated with a first cell group configured for the UE exceeded an uplink error rate threshold. The operations of 1705 may be performed according to the methods described herein. In some examples, aspects of the operations of 1705 may be performed by an RLF indication receiving component as described with reference to FIGS. 9 through 12.

At 1710, the base station may transmit, to the UE, a cell group reconfiguration message to release the first cell group configured for the UE and reconfigure a second cell group for the UE based on the radio link failure indication. The operations of 1710 may be performed according to the methods described herein. In some examples, aspects of the operations of 1710 may be performed by a cell group reconfiguring component as described with reference to FIGS. 9 through 12.

At 1715, the base station may transmit a request for the UE to refrain from measuring radio link failure or transmitting another radio link failure indication for a delay period based on receiving the radio link failure indication. The operations of 1715 may be performed according to the methods described herein. In some examples, aspects of the operations of 1715 may be performed by a measurement refraining request component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving an uplink grant via downlink control signaling for a cell group; identifying a radio link failure condition for uplink based at least in part on an uplink error rate associated with the downlink control signaling exceeding an uplink error rate threshold; and transmitting a radio link failure indication indicating that the radio link failure condition is based at least in part on the uplink error rate.

Aspect 2: The method of aspect 1, wherein identifying the radio link failure condition further comprises: determining that a downlink error rate associated with the cell group exceeds a downlink error rate threshold.

Aspect 3: The method of any of aspects 1 through 2, further comprising: determining whether the uplink error rate exceeds the uplink error rate threshold for a period of time, wherein the radio link failure indication is transmitted based at least in part on the determining.

Aspect 4: The method of any of aspects 1 through 3, wherein the uplink error rate is based at least in part on a block error rate (BLER) or uplink feedback, or both.

Aspect 5: The method of any of aspects 1 through 4, further comprising: refraining from performing measurements for radio link failure or transmitting another radio link failure indication for a delay period based at least in part on transmitting the radio link failure indication.

Aspect 6: The method of any of aspects 1 through 5, further comprising: receiving a request to refrain from performing measurements for radio link failure or transmitting another radio link failure indication for a delay period based at least in part on transmitting the radio link failure indication.

Aspect 7: The method of any of aspects 1 through 6, further comprising: refraining from transmitting a measurement report for the cell group after transmitting the radio link failure indication.

Aspect 8: The method of any of aspects 1 through 7, further comprising: receiving a cell group reconfiguration message based at least in part on transmitting the radio link failure indication; releasing the cell group based at least in part on the cell group reconfiguration message; and connecting to another cell group indicated by the cell group reconfiguration message.

Aspect 9: The method of aspect 8, wherein the cell group reconfiguration message is a radio resource control connection reconfiguration message.

Aspect 10: The method of any of aspects 1 through 9, wherein the cell group is a secondary cell group.

Aspect 11: The method of any of aspects 1 through 10, wherein the UE is configured for standalone communications or non-standalone communications.

Aspect 12: A method for wireless communications at a base station, comprising: receiving a radio link failure indication for uplink from a UE indicating that an uplink error rate associated with a first cell group configured for the UE exceeded an uplink error rate threshold; and transmitting, to the UE, a cell group reconfiguration message to release the first cell group configured for the UE and reconfigure a second cell group for the UE based at least in part on the radio link failure indication.

Aspect 13: The method of aspect 12, further comprising: transmitting a request for the UE to refrain from measuring radio link failure or transmitting another radio link failure indication for a delay period based at least in part on receiving the radio link failure indication.

Aspect 14: The method of any of aspects 12 through 13, further comprising: configuring the UE to refrain from transmitting a measurement report for the first cell group based at least in part on the UE transmitting the radio link failure indication.

Aspect 15: The method of any of aspects 12 through 14, further comprising: determining, based at least in part on the radio link failure indication, that a downlink error rate associated with the first cell group exceeds a downlink error rate threshold, wherein the cell group reconfiguration message is transmitted based at least in part on the downlink error rate exceeding the downlink error rate threshold.

Aspect 16: The method of any of aspects 12 through 15, wherein the uplink error rate is based at least in part on a block error rate (BLER) or uplink feedback, or both.

Aspect 17: The method of any of aspects 12 through 16, wherein the first cell group is a secondary cell group.

Aspect 18: The method of any of aspects 12 through 17, further comprising: configuring the UE for standalone communications or non-standalone communications.

Aspect 19: The method of any of aspects 12 through 18, wherein the cell group reconfiguration message comprises a radio resource control connection reconfiguration message.

Aspect 20: An apparatus for wireless communication at a UE, comprising a processor; memory coupled with the processor; and instructions stored in the memory and executable by the processor to cause the apparatus to perform a method of any of aspects 1 through 11.

Aspect 21: An apparatus for wireless communication at a UE, comprising at least one means for performing a method of any of aspects 1 through 11.

Aspect 22: A non-transitory computer-readable medium storing code for wireless communication at a UE, the code comprising instructions executable by a processor to perform a method of any of aspects 1 through 11.

Aspect 23: An apparatus for wireless communications at a base station, comprising a processor; memory coupled with the processor; and instructions stored in the memory and executable by the processor to cause the apparatus to perform a method of any of aspects 12 through 19.

Aspect 24: An apparatus for wireless communications at a base station, comprising at least one means for performing a method of any of aspects 12 through 19.

Aspect 25: A non-transitory computer-readable medium storing code for wireless communications at a base station, the code comprising instructions executable by a processor to perform a method of any of aspects 12 through 19.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving an uplink grant via downlink control signaling for a cell group;
   identifying a radio link failure condition for uplink based at least in part on an uplink error rate associated with uplink signaling exceeding an uplink error rate threshold; and
   transmitting a radio link failure indication indicating that the radio link failure condition is based at least in part on the uplink error rate.

2. The method of claim 1, wherein identifying the radio link failure condition further comprises:
   determining that a downlink error rate associated with the cell group exceeds a downlink error rate threshold.

3. The method of claim 1, further comprising:
   determining whether the uplink error rate exceeds the uplink error rate threshold for a period of time, wherein the radio link failure indication is transmitted based at least in part on the determining.

4. The method of claim 1, wherein the uplink error rate is based at least in part on a block error rate (BLER) or uplink feedback, or both.

5. The method of claim 1, further comprising:
   refraining from performing measurements for radio link failure or transmitting another radio link failure indication for a delay period based at least in part on transmitting the radio link failure indication.

6. The method of claim 1, further comprising:
receiving a request to refrain from performing measurements for radio link failure or transmitting another radio link failure indication for a delay period based at least in part on transmitting the radio link failure indication.

7. The method of claim 1, further comprising:
refraining from transmitting a measurement report for the cell group after transmitting the radio link failure indication.

8. The method of claim 1, further comprising:
receiving a cell group reconfiguration message based at least in part on transmitting the radio link failure indication;
releasing the cell group based at least in part on the cell group reconfiguration message; and
connecting to another cell group indicated by the cell group reconfiguration message.

9. The method of claim 8, wherein the cell group reconfiguration message is a radio resource control connection reconfiguration message.

10. The method of claim 1, wherein the cell group is a secondary cell group.

11. The method of claim 1, wherein the UE is configured for standalone communications or non-standalone communications.

12. A method for wireless communications at a base station, comprising:
receiving a radio link failure indication for uplink from a user equipment (UE) indicating that an uplink error rate associated with a first cell group configured for the UE exceeded an uplink error rate threshold; and
transmitting, to the UE, a cell group reconfiguration message to release the first cell group configured for the UE and reconfigure a second cell group for the UE based at least in part on the radio link failure indication.

13. The method of claim 12, further comprising:
transmitting a request for the UE to refrain from measuring radio link failure or transmitting another radio link failure indication for a delay period based at least in part on receiving the radio link failure indication.

14. The method of claim 12, further comprising:
configuring the UE to refrain from transmitting a measurement report for the first cell group based at least in part on the UE transmitting the radio link failure indication.

15. The method of claim 12, further comprising:
determining, based at least in part on the radio link failure indication, that a downlink error rate associated with the first cell group exceeds a downlink error rate threshold, wherein the cell group reconfiguration message is transmitted based at least in part on the downlink error rate exceeding the downlink error rate threshold.

16. The method of claim 12, wherein the uplink error rate is based at least in part on a block error rate (BLER) or uplink feedback, or both.

17. The method of claim 12, wherein the first cell group is a secondary cell group.

18. The method of claim 12, further comprising:
configuring the UE for standalone communications or non-standalone communications.

19. The method of claim 12, wherein the cell group reconfiguration message comprises a radio resource control connection reconfiguration message.

20. An apparatus for wireless communication at a user equipment (UE), comprising:
a processor,
memory coupled with the processor; and
instructions stored in the memory and executable by the processor to cause the apparatus to:
receive an uplink grant via downlink control signaling for a cell group;
identify a radio link failure condition for uplink based at least in part on an uplink error rate associated with uplink signaling exceeding an uplink error rate threshold; and
transmit a radio link failure indication indicating that the radio link failure condition is based at least in part on the uplink error rate.

21. The apparatus of claim 20, wherein the instructions to identify a radio link failure condition are further executable by the processor to cause the apparatus to:
determine that a downlink error rate associated with the cell group exceeds a downlink error rate threshold.

22. The apparatus of claim 20, wherein the instructions are further executable by the processor to cause the apparatus to:
determine whether the uplink error rate exceeds the uplink error rate threshold for a period of time, wherein the radio link failure indication is transmitted based at least in part on the determining.

23. The apparatus of claim 20, wherein the uplink error rate is based at least in part on a block error rate (BLER) or uplink feedback, or both.

24. The apparatus of claim 20, wherein the instructions are further executable by the processor to cause the apparatus to:
refrain from performing measurements for radio link failure or transmitting another radio link failure indication for a delay period based at least in part on transmitting the radio link failure indication.

25. The apparatus of claim 20, wherein the instructions are further executable by the processor to cause the apparatus to:
receive a cell group reconfiguration message based at least in part on transmitting the radio link failure indication;
release the cell group based at least in part on the cell group reconfiguration message; and
connect to another cell group indicated by the cell group reconfiguration message.

26. An apparatus for wireless communications, comprising:
a processor,
memory coupled with the processor; and
instructions stored in the memory and executable by the processor to cause the apparatus to:
receive a radio link failure indication for uplink from a user equipment (UE) indicating that an uplink error rate associated with a first cell group configured for the UE exceeded an uplink error rate threshold; and
transmit, to the UE, a cell group reconfiguration message to release the first cell group configured for the UE and reconfigure a second cell group for the UE based at least in part on the radio link failure indication.

27. The apparatus of claim 26, wherein the instructions are further executable by the processor to cause the apparatus to:
transmit a request for the UE to refrain from measuring radio link failure or transmitting another radio link failure indication for a delay period based at least in part on receiving the radio link failure indication.

28. The apparatus of claim 26, wherein the instructions are further executable by the processor to cause the apparatus to:
configure the UE to refrain from transmitting a measurement report for the first cell group based at least in part on the UE transmitting the radio link failure indication.

29. The apparatus of claim 26, wherein the instructions are further executable by the processor to cause the apparatus to:
determine, based at least in part on the radio link failure indication, that a downlink error rate associated with the first cell group exceeds a downlink error rate threshold, wherein the cell group reconfiguration message is transmitted based at least in part on the downlink error rate exceeding the downlink error rate threshold.

30. The apparatus of claim 26, wherein the cell group reconfiguration message comprises a radio resource control connection reconfiguration message.

\* \* \* \* \*